United States Patent
Koboshi et al.

[11] Patent Number: 5,989,791
[45] Date of Patent: Nov. 23, 1999

[54] PHOTOGRAPHIC PRINTING METHOD

[75] Inventors: Shigeharu Koboshi; Masao Ishikawa; Shinichi Kuriyama, all of Hino, Japan

[73] Assignee: Konica Corporation, Japan

[21] Appl. No.: 09/062,221

[22] Filed: Apr. 17, 1998

Related U.S. Application Data

[30] Foreign Application Priority Data

Apr. 22, 1997 [JP] Japan .................................. 9-120202
Jul. 1, 1997 [JP] Japan .................................. 9-176078

[51] Int. Cl.⁶ ............................................. G03C 5/29
[52] U.S. Cl. .................... 430/434; 430/357; 430/394; 430/401
[58] Field of Search .................... 430/434, 357, 430/394, 401

[56] References Cited

U.S. PATENT DOCUMENTS

| | | | |
|---|---|---|---|
| 5,374,972 | 12/1994 | Nakane et al. | 396/613 |
| 5,432,580 | 7/1995 | Tokuda | 396/570 |
| 5,436,688 | 7/1995 | Tanaka | 396/617 |
| 5,508,783 | 4/1996 | Iwagaki et al. | 355/40 |
| 5,600,386 | 2/1997 | Saito et al. | 396/315 |
| 5,745,219 | 4/1998 | DeMarti, Jr. et al. | 355/40 |
| 5,861,942 | 1/1999 | Ohsone et al. | 355/27 |

*Primary Examiner*—Hoa Van Le
*Attorney, Agent, or Firm*—Jordan B. Bierman; Bierman, Muserlian and Lucas

[57] ABSTRACT

In a method of reprinting an image on a frame of a film piece among plural film pieces received with a printing order onto a photographic paper, the plural film pieces are incorporated into a film assemblage without splicing the plural film pieces with no consideration whether each of the plural film pieces has a frame to be reprinted; the plural film pieces are fed out of the film assemblage; the image of the film piece among the plural film pieces fed from the film assemblage is exposed onto the photographic paper; and the exposed photographic paper is developed so as to obtain a visual image.

18 Claims, 11 Drawing Sheets

FIG. 3
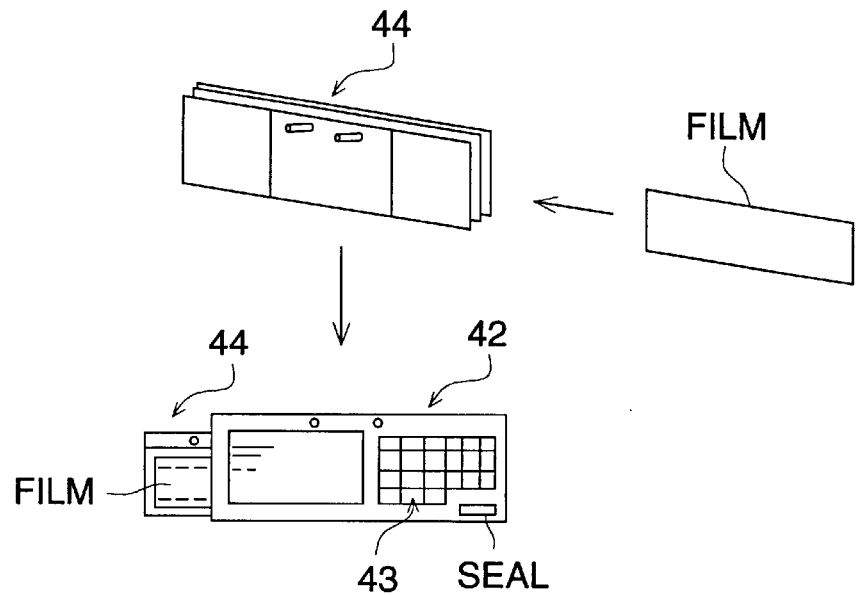
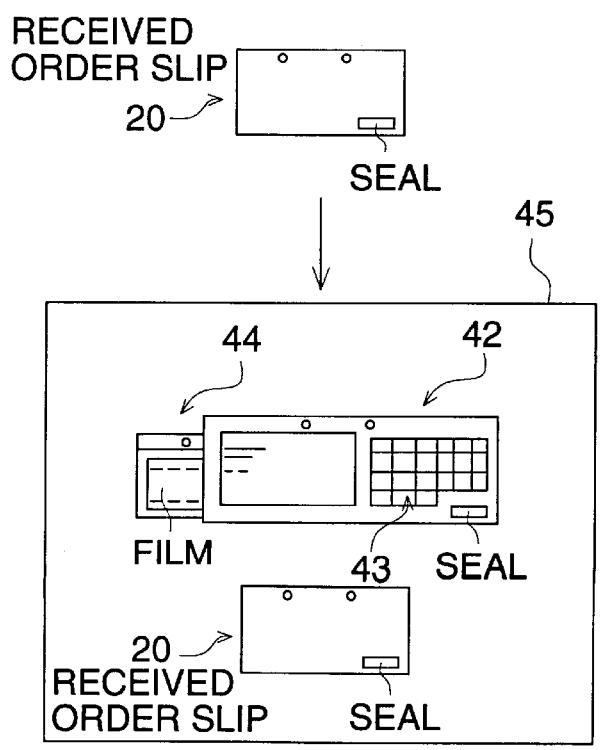

FIG. 5

| RECEIPT No. \ ASSORTING APPARATUS | 80 | 91 |
|---|---|---|
| 0062537 | 2 | 10 |
| 0177399 | 4 | 21 |
| 0043528 | 3 | 3 |
| ⋮ | ⋮ | ⋮ |
| 00325117 | 2 | 45 |
| 00294325 | 1 | 38 |

FIG. 9

| FINISH DATE | | RECEIPT No. 1234567 |
|---|---|---|
| RECEIPT DATE | | |

| CUSTOMER'S NAME<br>TARO KONISHI<br>TEL 03 - 1234 - 5678 | DEALING SHOP No.<br>005 |
|---|---|

| ~~SIMUL-PRINT~~ | NEGA-PRINT | DEVELOP ONLY |
|---|---|---|

| 24EX-FILM DEVELOP | ONE | 300 YEN |
|---|---|---|
| LC-PRINT | 23 SHEETS | 115 YEN |
| | | TOTAL<br>415 YEN |

| NEGA-PRINT FRAME No. | NUMBER OF PRINTS | |
|---|---|---|
| No. ------ | SHEETS | YEN |
| No. ------ | SHEETS | YEN |
| | | TOTAL |

ONE YEAR ANNIVERSARY SALE

B & B DRUG

PHOTOGRAPHIC PRINTING METHOD

BACKGROUND OF THE INVENTION

The present invention relates to a method of photographic printing for processing a large amount of photographic film for printing.

Here, "photographic processing system" refers to an aggregation of two or more devices which simultaneously conduct photographic processing (developing of an undeveloped photographic film, exposure of an image from aforesaid developed photographic film onto photographic paper, cutting of sheets of aforesaid developed photographic film, housing of the developed photographic film into an envelope, developing of the exposed photographic paper, cutting of aforesaid developed photographic paper (which is called a print) and returning of the developed photographic film and print to the customer) Specifically, it is referred to as an aggregation of integral devices or devices connected by the use of a conveyance means.

In this specification, the word 'a photographic film' is used for a roll of photographic film received by a cartridge sold on the market or its developed or undeveloped equivalent taken out of the cartridge for processing, and also the word 'photographic film' as a material noun is used in such a manner as 'a piece of photographic film' in many cases.

Generally speaking, in most cases, the customer, the owner of photographic films ask the store dealing in services concerning photographic processing (hereinafter referred to as the dealing store for simplicity' sake) for development processing of the image-exposed but undeveloped films and print processing (generally called simultaneous print processing) to obtain photographic prints by printing the images in the developed photographic films onto sheets of a photographic paper, for only print processing (generally called re-print processing or re-ordered print) to obtain photographic prints by printing the images in the already developed photographic films, or for only the development processing of the image-exposed but undeveloped photographic films (generally called the development-only-processing). This dealing store carries out the above-mentioned processing in its own house in some cases, however, in the case of stores dealing in a large amount of requests of their customers, they pass orders for the requests of their customers to the photographic processing company called the large laboratory which makes the photographic film processing requested by the customers received at plural dealing stores. Further, in some cases, the customer issues the order directly to the large laboratory.

The dealing store delivers to the large laboratory the image-exposed but undeveloped photographic films or the already developed photographic films put in a sack on which are recorded several pieces of information such as the customer's name, the telephone number of the customer, the receipt date and hour of the request to order, date and hour to be finished, the name of the film maker, the information concerning which the order is, the one for the simultaneous print processing, for the re-print, or for the development-only, the information for discriminating the frames of the photographic film for which the print processing is requested and the number of prints corresponding to the frames in case of re-print processing, the print size (the print size herein referred to indicates the size of the photographic paper sheets on which the images in the photographic film are printed, for example, E- and L-size.), and the surface finish of the photographic paper (calendered, or silk-calendered) (the above-mentioned information is not always fully recorded but appropriately selected items only are recorded, and sometimes the information other than the above-mentioned is recorded.).

Further, in case where the customer issues the order directly to the large laboratory, the image-exposed but undeveloped photographic films or the already developed photographic films put in such sacks as mentioned above are delivered to the large laboratory. In these sacks usually is put an amount of the photographic film corresponding to one order unit of it image-exposed but undeveloped or already developed. The word 'one order unit' used herein means a unit of the photographic film in the request to order, which is one roll of the photographic film or its equivalent at the largest, and defined for discriminating the photographic films on the occasion of requesting the dealing stores to order the photographic processing by the customer, and indicates each full-sized film in case of full-sized films, and in case where the full-sized film is divided into several pieces it indicates the assembly of the pieces made by being divided for the processing requested by the customer to the dealing stores (hereinafter referred to as cut pieces or cut films). For example, it corresponds to one photographic film of 135-type accommodated in the 135-type photographic film cartridge handed to the dealing store by the customer at the time of request to order to make the processing, or to the assembly of cut pieces, which is based on a 135-type photographic film, made by dividing it after developing, handed to the dealing store by the customer at the time of request to order to make the processing.

Incidentally, in the present specification, a developed photographic film has the same meaning as a film for printing. Therefore, in a 135-type photographic film, a film for printing in one order is referred to as a developed photographic film for one roll of photographic film accommodated in a cartridge for one photographic film or an aggregation of cut piece prepared by separating a developed photographic film for one roll (in maximum, the above-mentioned developed photographic film for one roll).

Upon receiving the image-exposed but undeveloped film or the already developed film put in the above-mentioned sack, the large laboratory carries out the photographic film processing in accordance with the request of the customer recorded on the above-mentioned sack. In the case of the image-exposed but undeveloped photographic film, plural photographic films are adhered with a splicing tape to make a long roll for carrying out the photographic film processing. After the completion of the photographic film processing in accordance with the request of the customer, the photographic films are finally put in the aforesaid sacks, one order unit of the film in one sack, to be returned to the dealing store or directly to the customer.

Here, re-printing of plural orders in a conventional large scale photo-finishing laboratory will be explained.

Among cut films housed in a negative film case received from a customer (in one negative film case, plural sheets of cut film for one order are housed), cut films which are not to be printed remain in the negative film case so that cut films requested to be printed can be distinguished.

There may be cases in which a sheet of cut film being shorter than 3 frames (9 cm or less) among cut films included among aforesaid negative film sheet received from the customer. In such cases, the operator must separate the cut films of 9 cm or less and handle them differently from the cut film having ordinary length (being 4 or more frames).

As described above, in the re-printing method in the conventional large scale photo-finishing laboratory, the cut film including frame number ordered to be printed were distinguished from the cut films not ordered to be printed among all cut films included in the negative film sheet received from the customer or the cut films of 9 cm or less were distinguished from the cut films having more than 9 cm.

The reason for this was that it was considered that operation efficiency was reduced by that cut films including frames ordered to be printed and/or cut films having ordinary length (being 3 frames or more) could not be continually exposed due to passage of sheets of cut films not including frames ordered to be printed or cut films having 9 cm or less through the exposure step.

In other words, conventionally, it used to be widely considered to be effective to distinguish cut films including frames ordered to be printed or cut films having 3 frames or more from cut films not including frames ordered to be printed or cut films being 9 cm or less since only cut film including frames ordered to be printed or cut films having 3 frames or more could be continually exposed.

However, as a result of laboriously studying the possibility of improving effectiveness of re-printing operations, due to the present invention, a method of conducting re-printing operations effectively which exceeded conventional technologies in which an operation time to distinguish cut films was eliminated.

SUMMARY OF THE INVENTION

The objects of this invention can be accomplished by the methods written in each of the following paragraphs.

Item 1. A method of reprinting an image on a frame to be reprinted of a photographic film of a plurality of photographic films which belong to a reprint order. said plurality of photographic films containing a photographic film which consists of frames not to be reprinted, comprising:

forming a film assemblage which comprises all of said plurality of photographic films without splicing;

exposing said image on said frame to be reprinted onto a photographic paper; and developing said photographic paper.

A method of reprinting an image on a frame of a photographic film pieces which belongs to a reprint order, wherein said reprint order contains first group of a plurality of photographic film pieces which have a frame with request for reprinting and second group of a plurality of photographic film pieces which have no frame with request for reprinting, comprising:

forming a film assemblage which comprises all of said plurality of photographic film pieces of said reprint order without splicing;

exposing said image on said frame to be reprinted onto a photographic paper; and developing said photographic paper.

A method of reprinting an image on a frame of a photographic film piece which belongs to a reprint order, wherein said reprint order contains a plurality of photographic film pieces at least one of which pieces containing no frames being ordered to be reprinted, comprising:

forming a film assemblage which comprises all of said plurality of film pieces of said reprint order without splicing, exposing said image on said frame to be reprinted onto a photographic paper, and developing said photographic paper.

A method of reprinting an image on a frame of a photographic film piece which belongs to a reprint order, wherein said reprint order contains a plurality of photographic film pieces at least one of which pieces containing no frames being ordered to be reprinted, comprising:

forming a film assemblage which comprises all of said plurality of film pieces of said reprint order without splicing, exposing said image on said frame being ordered to be reprinted by feeding said plurality of photographic films from said film assemblage to a printer to reproduce said image onto a photographic paper, and developing said photographic paper.

A method of reprinting an image on a frame of a film piece among plural film pieces received with a printing order onto a photographic paper, comprising:

incorporating the plural film pieces into a film assemblage without splicing the plural film pieces with no consideration whether each of the plural film pieces has a frame to be reprinted;

feeding the plural film pieces out of the film assemblage;

exposing the image of the film piece among the plural film pieces fed from the film assemblage onto the photographic paper; and developing the exposed photographic paper so as to obtain a visual image.

Since it is not necessary to provide an operation to distinguish cut films including frames ordered to be printed, time necessary for the operation to distinguish cut films including frames ordered to be printed can be eliminated. In addition, an operation to check cut films including frames ordered to be printed with cut films not including frames ordered to be printed is not necessary. Accordingly, effectiveness and speed of the re-printing operation can be improved.

Incidentally, in the present specification, "adhere" means the condition between adjoining or connecting developed sheets of film in which, by force to move one of two adjoining or contacting developed film, the other connectedly move.

Item 2. A method of reprinting an image on a frame to be reprinted of a photographic film of a plurality of photographic films which belong to a reprint order. said plurality of photographic films containing a photographic film which consists of frames not to be reprinted, which method comprising:

forming a film assemblage which comprises all of said plurality of photographic films without splicing;

exposing said image on said frame to be reprinted onto a photographic paper; and developing said photographic paper;

making said plurality of photographic films corresponding to said developed photographic paper; and wherein a group of said plurality of films corresponding to each said reprint order in said film assemblage have recorded information for identifying the order.

A method of reprinting an image on a frame of a photographic film piece which belongs to a reprint order, wherein said reprint order contains a plurality of photographic film pieces at least one of which pieces containing no frames being ordered to be reprinted. comprising;

forming a film assemblage which comprises all of said plurality of film pieces of said reprint order without splicing, exposing said image on said frame to be reprinted onto a photographic paper, developing said photographic paper, and making the correspondence of said developed photographic paper with said plurality of film pieces of said reprint order.

Since it is not necessary to provide an operation to distinguish cut films including frames ordered to be printed, time necessary for the operation to distinguish cut films including frames ordered to be printed can be eliminated. In addition, an operation to check cut films including frames ordered to be printed against cut films not including frames ordered to be printed is not necessary. Still further, since information showing specific order is recorded, it is easy to correspond films for printing belonging to an order with developed papers for each of specific order. Accordingly, effectiveness of the re-printing operation can be improved.

Item 3. A method of printing an image on a frame of a photographic film of a plurality of photographic films which belong to a print order, comprising:

forming a film assemblage containing a film piece of not longer than 9 cm without splicing;

exposing said image on a frame of said photographic film onto a photographic paper;

developing said photographic paper; and making said plurality of photographic films corresponding to said developed photographic paper.

Since an operation to distinguish cut films based upon the length of the cut films, time for the operation of distinguishing cut films having 9 cm or less can be eliminated. In addition, an operation to check the cut films being 9 cm or less from cut films having more than 9 cm is not necessary. Accordingly, effectiveness of the re-printing operation can be improved.

Item 4. The method of Item 1, wherein the film assemblage comprises a plurality of sets of said plurality of photographic films are received with plural printing orders. In a photographic printing method in which the film assemblage comprises plural printing orders, effectiveness of the printing operation can be improved.

Item 5. The method of Item 1. wherein the plurality of photographic films are negative films.

In a photographic printing method in which a printing film is a color negative film, effectiveness of the printing operation can be improved.

Item 6. The method of claim 1, wherein the photographic paper is a color negative photographic paper. In a photographic printing method in which the photographic paper is a color negative photographic paper, effectiveness of the printing operation can be improved.

BRIEF DESCRIPTION OF THE DRAWINGS

FIG. 3 is a drawing illustrating how the short-sized photographic film piece is received in the sack for receiving the photographic film piece;

FIG. 5 is a table for fixing the next sending spot for the image-exposed but undeveloped photographic film and the developed photographic film in a large laboratory;

FIG. 9 shows an embodiment of the information-recorded medium;

DETAILED DESCRIPTION OF THE PREFERRED EMBODIMENT

Hereinafter an example of the embodiment of this invention will be explained. However, the embodiment of this invention is not to be confined to this.

Now, the procedure until a photographic film which is the object of the processing requested in the order by a customer, that is, an image-exposed but undeveloped photographic film or a developed photographic film, is delivered to the large laboratory will be explained.

First, the operation carried out at a dealing store when the customer requests the dealing store to make an order for the simultaneous print processing or the re-print processing will be explained.

Figure 2:
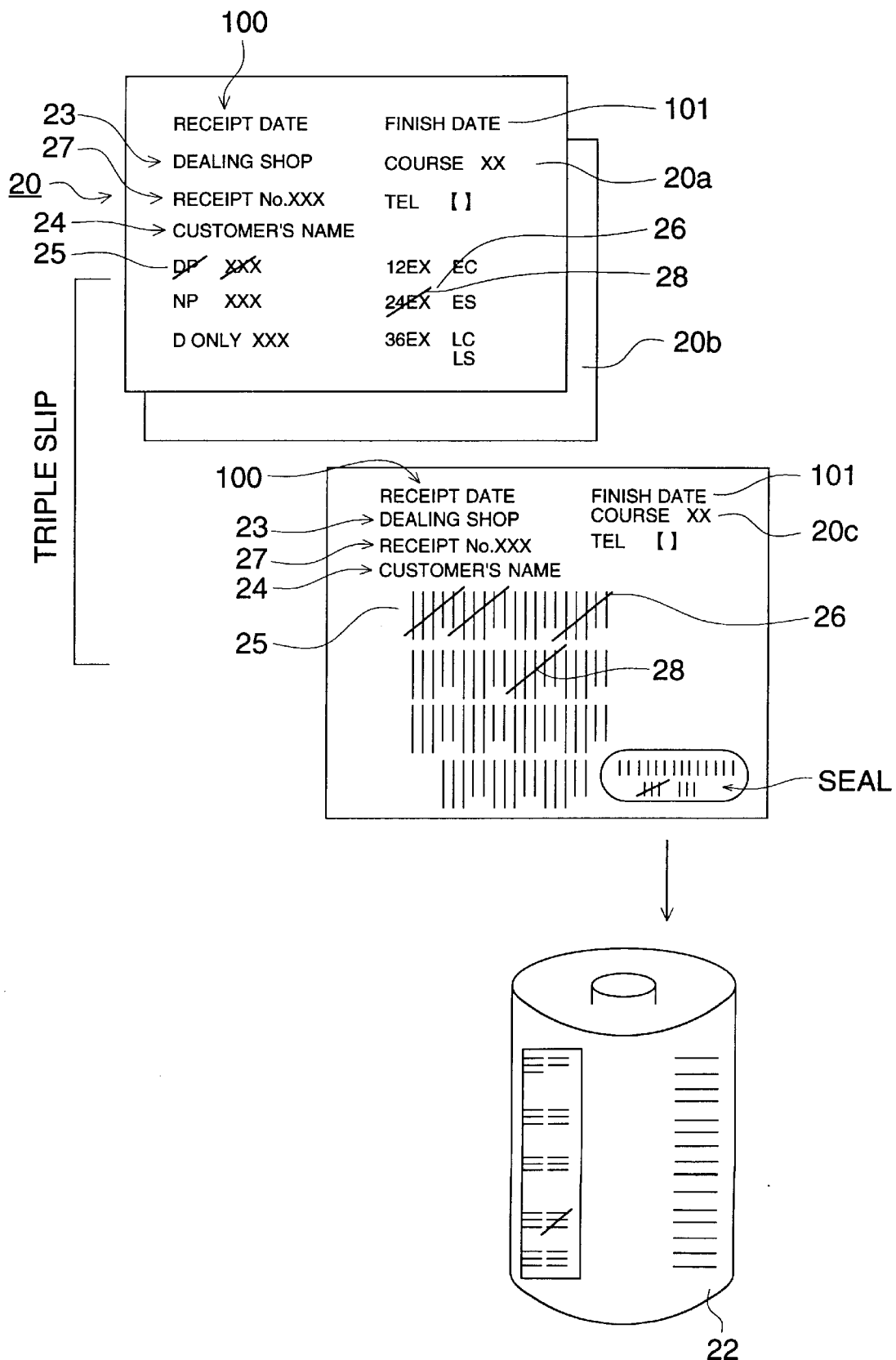
FIG. 2 is a drawing illustrating what kind of information is recorded on the received order slip at the front of a dealing store.

At the front of the dealing store, necessary information is recorded on the received order slip shown in FIG. 2 by the customer or a clerk in the store. Now, the explanation about this received order slip will be given. The received order slip 20 is a triple slip composed of three sheets, that is, an exchange voucher 20a for the customer, an order slip 20b for the store, and a laboratory-inputted bar code slip 20c for the large laboratory, and it adopts the pressure sensitive recording method, therefore by making the record with a ball-point pen or the like by the customer or the clerk in the dealing store on the top sheet, the exchange voucher for the customer, recording is made simultaneously on the three sheets. Thus the same information is owned by the customer, the dealing store, and the large laboratory in common.

The information recorded on the received order slip includes the following:

The information specifying the dealing store 23 which received the photographic film (hereinafter, it will be referred to as the dealing-store specifying information. 'In some processes in the large laboratory described later, sometimes it functions as the returning spot specifying information to specify the returning spot for the product with which the ordered processing has been made'); the information specifying the customer 24 who requested the processing of the photographic film (definitely speaking, it comprises the name of the customer, some number, and some mark. Hereinafter, it will be referred to as the customer specifying information. In some processes in the large laboratory described later, sometimes it functions as the returning spot specifying information to specify the returning spot for the product with which the ordered processing has been made.); the receipt number 27 (hereinafter in this embodiment of the invention, a consecutive number which is available in the plural dealing stores having transactions with the large laboratory is used for this number, but a consecutive number which is available only in each of the dealing stores may be used. Further, this receipt number may well be printed in advance by the dealing stores or the large laboratory. This number functions as the photographic-film specifying information for specifying the photographic film in the processes in the large laboratory described later.); the information 25 on which the order is, the one for the simultaneous print processing, for the reprint, or for the development-only; the print specification information 26 (These bits of information 25 and 26 function as the next sending spot fixing information of the photographic film for fixing the spot where the film is to be sent next in the processes in the large laboratory described later.); the information 28 indicating which the photographic film is with regard to the number of exposures; the receipt date and hour 100; and the finish date and hour 101 (These bits of information 100 and 101 has no function in this embodiment of the invention, but in some cases, they function as the next sending spot fixing information of the photographic film in the processes in the large laboratory.). Further, the ordered frame specifying information which is recorded when the customer requests the re-print processing, and the number-of-print information may be included (The explanation about these two bits of information will be given later.).

On the laboratory-inputted bar code slip 20c, it is put a sheet or overlapped plural sheets of seal, which is a recording medium capable of picking off, and the receipt number is printed on it, converted into a bar code. The receipt number should favorably be converted into a bar code in accordance with the format designated by the large laboratory. By doing this, the photographic films can be easily controlled in the large laboratory meeting the request of orders from the plural dealing stores.

The signs EC, ESC, LC, and LSC in the print specification information consist of E and L indicating the width of the long roll of photographic paper and C (calendered) and SC (silk-calendered) indicating the quality of the surface of the long roll of photographic paper loaded in the exposure apparatus.

In case where a customer requests the dealing store to make an order for the processing of an image-exposed but undeveloped photographic film (in case of the simultaneous print processing or the development-only processing), recording is made on the topmost sheet of the received order slip 20, the exchange voucher 20a for the customer, by a ball-point pen or the like, made on the three slip sheets (referred to as sheets simply) simultaneously as mentioned before. Regarding the plural seals capable of picking off which are put on the laboratory-inputted bar code slip 20c, with the receipt number printed on it as converted into a bar code, one of them is picked off to be put on the container (made of a metal or a resin) receiving the image-exposed but undeveloped photographic film of the customer. As for the exchange voucher for the customer 20a among the three slip sheets on which the recording has been made, it is handed to the customer, and the order slip 20b for the dealing store is kept by the store, and the above-mentioned laboratory-inputted bar code slip 20c on which the recording has already been made, with one of the plural seals capable of picking off picked off, and the container receiving the image-exposed but undeveloped photographic film of the customer, on which one of the seals capable of picking off has been put, are delivered to the large laboratory.

In case where a customer requests the dealing store to make an order for the re-print processing, the developed cut film pieces made by cutting the long-sized photographic film is in the state of being received by the photographic film receiving sack 44 shown in FIG. 3. In this embodiment of the invention, an example of the case where the customer orders the print processing of the images (also called a frame) in the developed cut pieces is disclosed, however, sometimes the customer orders the print processing of the images in the developed long-sized photographic film, and in that case as a matter of course, a photographic film receiving sack capable of receiving the long-sized photographic film is prepared. The photographic film receiving sack containing the developed cut pieces is handed to the dealing store by the customer, packaged in the receiving sack packaging member 42 shown in FIG. 3, if the customer requests the processing of the photographic film received of the same dealing store as requested the last time. Further, if the packaging member packaging the developed cut pieces is different from that used in the dealing store of which the order is requested this time, the receiving sack for the developed cut pieces of photographic film is made to be in the state of being packaged in the receiving-sack packaging member 42 in the dealing store of this time.

On the receiving sack packaging member 42 there is provided an order table 43, wherein at least the information specifying the image frame (hereinafter referred to as the ordered frame specifying information) which the customer wanted to be processed for printing and the information on how many prints are to be made for this image frame which the customer wanted to be processed for re-printing (hereinafter referred to as the number-of-print information) can be recorded. However, if the received order slip 20 is made to be the one such that the ordered frame specifying information and the number-of-print information for the frames ordered can be recorded on it, it is not required to provide an order table on the receiving-sack packaging member 42.

The ordered frame specifying information and the number-of-print information for the frames specified are recorded in the order table on the receiving sack packaging member 42 by the customer, and the recording is made on the received order slip just in the same manner as the case where customer requests the order for the processing of the image-exposed but undeveloped photographic film (However, in case where the received order slip 20 is made to be the one such that the ordered frame specifying information and the number-of-print information for the frames ordered can be recorded on it, there recorded are the ordered frame specifying information and the number-of-print information.), then one of the single or plural seals capable of picking off which are put on the laboratory-inputted bar code slip 20c, with the receipt number printed on it as converted into a bar code, is picked off and put on the photographic film receiving sack 44 or on the receiving sack packaging member 42. Further, as for the exchange voucher for the customer 20a among the three slip sheets on which the recording has been made, it is handed to the customer; the order slip 20b for the dealing store is kept by the store, and the above-mentioned laboratory-inputted bar code slip 20c on which the recording has already been made, with one of the single or plural seals capable of picking off picked off, and the receiving sack packaging member 42, which packages the photographic film receiving sack 44 containing the developed cut film pieces, are delivered to the large laboratory. Repeatedly saying, on the occasion of the delivery to the large laboratory, the one of the seals capable of picking off is put on the photographic film receiving sack 44 or on the receiving sack packaging member 42.

Up to now, the operation carried out in the dealing store in case where a customer requests the dealing store to make an order for the processing of an image-exposed but undeveloped photographic film or a developed photographic film has been explained.

In the following, the operation carried out by a customer in case where the customer requests the large laboratory directly not through the dealing store to make the processing of an image-exposed but undeveloped photographic film or a developed photographic film will briefly be explained.

In case where a customer requests directly, not through the dealing store, the large laboratory to order to make the processing of an image-exposed but undeveloped photographic film or a developed photographic film (for example, in case of utilizing some unmanned order receiving apparatus or facilities for photographic processing: in this case, the returning operation of the processed articles is made through the apparatus or facilities, or it is made by mailing the article without using the apparatus or facilities.), the operations to be made by the customer are equivalent to the operations such that the operations such as recording of the dealing store specifying information in the received order slip 20, keeping the order slip 20b for the dealing store by the store are omitted from the operations made in the dealing store when a customer requests the dealing store to order the processing of an image-exposed but undeveloped photographic film or developed photographic film. (However, if the returning of the articles, with which the photographic processing is made utilizing the unmanned order receiving apparatus or facilities for photographic processing, is carried out through the apparatus or facilities, the information specifying the apparatus or facilities is recorded in the received order slip 20.) It may be superfluous to add the following, however, it is favorable of course that, on the received order slip 20, the receipt number is printed in advance by the large laboratory and the information that indicates that the customer has requested directly, not through the dealing store, the large laboratory to make the processing of the image-exposed but undeveloped film or the developed film; it is not required that the dealing store specifying information is not included in the information printed as converted into a bar code on the single or plural seals capable of picking off, which are put on the laboratory-inputted bar code slip 20c (However, if the returning of the articles, with which the photographic processing is made utilizing the unmanned order receiving apparatus or facilities for the photographic processing, is carried out through the apparatus or facilities, the information specifying the apparatus or facilities is included instead of it.).

Up to now, the explanation has been given about the embodiment wherein the single or plural seals capable of picking off are put on the laboratory-inputted bar code slip 20c, but the above-mentioned seals capable of picking off are not always required to be put on the laboratory-inputted bar code slip 20c. In this case, the laboratory-inputted bar code slip 20c on which the recording has already been made and the receiving container receiving the image-exposed but undeveloped photographic film of the customer, or the laboratory-inputted bar code slip 20c on which the recording has already been made and the receiving sack packaging member 42 packaging the photographic film receiving sack 44 are delivered in the state wherein both articles are in some way made to be in correspondence to each other, for example, each pair of the laboratory-inputted bar code slip 20c and the receiving container receiving the image-exposed but undeveloped photographic film corresponding to each other, or each pair of the laboratory-inputted bar code slip 20c and the receiving sack packaging member 42 corresponding to each other is packed in a bag. Then in the large laboratory a seal, on which the same number as the receipt number recorded on the laboratory-inputted bar code slip 20c is recorded, is put on the receiving container receiving the image-exposed but undeveloped photographic film, the photographic film receiving sack 44, or the receiving sack packaging member 42.

Further, up to now, the explanation has been given about the embodiment in which the laboratory-inputted bar code slip 20c on which the recording has already been made is delivered to the large laboratory without further operation, it will also do well to read the information recorded on the laboratory-inputted bar code slip 20c, then to memorize it in an electronic recording medium to transmit the memorized information to the large laboratory, or to memorize it in a portable electronic recording medium (for example, such as a floppy disc) to be delivered to the large laboratory. However, in the above-mentioned cases, in order to maintain the relationship of correspondence such that which information recorded on a laboratory-inputted bar code slip 20c corresponds to which receiving container receiving the image-exposed but undeveloped photographic film or to which receiving sack packaging member 42 packaging the photographic film receiving sack 44 receiving the developed cut pieces of photographic film, the above-mentioned seal is put on the image-exposed but undeveloped photographic film, the photographic film receiving sack 44, or the receiving sack packaging member 42 to make correspondence to the information recorded on each laboratory-inputted bar code slip 20c, which is memorized in the electronic recording medium.

The explanations up to now have been given about the procedure until an image-exposed but undeveloped photographic film or a developed film with which the customer requests the order for the processing is delivered to the large laboratory.

In the following, the explanation about the operations carried out in the large laboratory after an image-exposed but undeveloped photographic film or a developed film with which the customer requests the order for the processing is delivered to the large laboratory. First, the inputting and memorizing of the information in the control computer 51 shown in FIG. 1, which are carried out after the image-exposed but undeveloped photographic film or the developed film with which the customer requests the order for the processing is delivered to the large laboratory will be explained.

The inputting and memorizing process of the information in the control computer 51, which are carried out after an image-exposed but undeveloped photographic film or a developed film, with which the customer requests the dealing store to make an order for the processing, is delivered to the large laboratory will be explained.

When the above-mentioned laboratory-inputted bar code slip 20c is delivered to the large laboratory through the dealing store together with the receiving container receiving the image-exposed but undeveloped photographic film, on which one of the seals capable of picking off on the laboratory-inputted bar code slip 20c is put, in the large laboratory the information recorded on the laboratory-inputted bar code slip 20c, that is, the dealing store specifying information, the customer specifying information, the receipt number, the information on which the order is, the one for the simultaneous print processing, for the re-print, or for the development-only, the print specification information, the information indicating the number of exposures of the photographic film, the receipt date and hour, the finish date and hour, and so forth are read by the slip reader 50, and these bits of information are inputted in the control computer 51 to be memorized in it. In the control computer, the receipt number and other information are memorized in such a manner as to be made in the state of correspondence to each other. (Further, in this embodiment of the invention, a consecutive number is used for the receipt number which is available in the plural stores having transactions with the large laboratory, however, in case where a consecutive number which is available only in each of the dealing stores, the information composed of the combination of the consecutive number and the dealing store specifying information is made to be in correspondence to a consecutive number which is available in the large laboratory to be memorized, and then this consecutive number which is available in the large laboratory and the above-mentioned other bits of information are memorized in the state of correspondence to each other. Further, in case where the consecutive number which is available in the large laboratory is not used, the combined information of said consecutive number which is available only in each dealing store and the dealing store specifying information is made to be in correspondence to the abovementioned other bits of information and memorized. Regarding this, the same procedure will be made also in case, described in the following, where the above-mentioned laboratory-inputted bar code slip 20c and the receiving sack packaging member 42 packaging the photographic film receiving sack 44 receiving the developed cut pieces of photographic film are delivered together to the large laboratory through the dealing store. Further, in case where the image-exposed but undeveloped film or the developed film with which the order for processing is made through not the dealing store but an unmanned order receiving apparatus or facilities for photographic processing is delivered to the large laboratory, and where the consecutive number which is available only in each of the unmanned apparatuses or facilities, the combined information of the information specifying the unmanned apparatus or facilities and this consecutive number is made to be in correspondence to the consecutive number which is available in the large laboratory to be memorized, and this consecutive number which is available in the large laboratory is made to be in correspondence to the information equivalent to the above-mentioned other bits of information and memorized. Moreover, if the consecutive number which is available in the large laboratory is not used, the combined information of the consecutive number which is available only in each of unmanned apparatuses or facilities and the information specifying the unmanned apparatus or facilities is made to be in correspondence to the information equivalent to the above-mentioned other bits of information, and memorized.)

Further, when the above-mentioned laboratory-inputted bar code slip 20c and the receiving sack packaging member 42 packaging the photographic film receiving sack 44 receiving the developed cut pieces of photographic film (On the photographic film receiving sack 44 or the receiving sack packaging member 42, one of the seals capable of picking off on the laboratory-inputted bar code slip 20c is put.) are delivered together to the large laboratory through the dealing store, in the large laboratory the information recorded on the laboratory-inputted bar code slip 20c, that is, the dealing store specifying information, the customer specifying information, the receipt number, the information on which the order is, the one for the simultaneous print processing, for the re-print, or for the development-only, the print specification information, the receipt date and hour, the finish date and hour, and so forth are read by the slip reader 50 (However, if the ordered frame specifying information and the number-of-print information for the ordered frames are recorded on the laboratory-inputted bar code slip 20c, these ordered frame specifying information and the number-of-print information for the ordered frames are also read.), and these bits of information are memorized in the control computer 51, wherein the receipt number and the other information are temporarily memorized in such a manner as to be made in the state of correspondence to each other.

In short, the receipt number and the other information, such as the dealing store specifying information, the customer specifying information, the information on which one the order is, for the simultaneous print processing, for the re-print processing, or for the development-only processing, the print specification information, the receipt date and hour, and the finish date and hour, are memorized in such a manner as to be made in the state of correspondence to each other. Further, at the same time when, or closely before or after the ordered frame specifying information and the number-of-print information for the ordered frames recorded in the order table 43 provided on the receiving sack packaging member 42 are read by the order table reader 53, the receipt number recorded on the seal capable of picking off put on the receiving sack packaging member 42 or the photographic film receiving sack 44 is read, and these bits of information are memorized in the control computer 51, wherein the receipt number and the other information are temporarily memorized in such a manner as to be made in the state of correspondence to each other. Then in the control computer 51, the above-mentioned two kinds of information are compared with each other, and those bits of information having the same receipt number are combined together as a lump of information, then the receipt number and the other information are memorized in such a manner as to be made in the state of correspondence. That is, the receipt number and the other information, such as the dealing store specifying information, the customer specifying information, the information on which the order is, the one for the simultaneous print processing, for the re-print, or for the development-only, the print specification information, the ordered frame specifying information, the number-of-print information for the ordered frames, the receipt date and hour, and the finish date and hour, are memorized in such a manner as to be made in the state of correspondence to each other.

Up to now, the memorizing process of the information in the control computer 51, which is carried out after an image-exposed but undeveloped photographic film or a developed film, with which the customer requests the dealing store to make an order for the processing, is delivered to the large laboratory has been explained. Now the memorizing process of the information in the control computer 51 after an image-exposed but undeveloped photographic film or a developed film, with which the customer requests directly not through the dealing store an order for the processing, is delivered to the large laboratory will be briefly explained. In this case, it is carried out the operation similar to that made after an image-exposed but undeveloped photographic film or a developed film, with which the customer requests the dealing store to make and order for the processing, is delivered to the large laboratory.

When the above-mentioned laboratory-inputted bar code slip 20c is delivered to the large laboratory directly not through the dealing store together with the receiving container receiving the image-exposed but undeveloped photographic film, on which one of the seals capable of picking off on the laboratory-inputted bar code slip 20c is put, the memorizing process of the information is made, but, of course, the dealing store specifying information is not recorded in the computer 51, because the dealing store is not concerned. That is, in the control computer, the receipt number and the other information, such as the customer specifying information, the information on which one the order is, for the simultaneous print processing, for the re-print processing, or for the development-only processing, the print specification information, the information indicating the number of exposures of the photographic film, the receipt date and hour, and the finish date and hour, are memorized in such a manner as to be made in the state of correspondence to each other.

Further, when the above-mentioned laboratory-inputted bar code slip 20c and the receiving sack packaging member 42 packaging the photographic film receiving sack 44 receiving the developed cut pieces of photographic film (On the photographic film receiving sack 44 or the receiving sack packaging member 42, one of the seals capable of picking off on the laboratory-inputted bar code slip 20c is put.) are delivered together to the large laboratory directly not through the dealing store, the memorizing process of the information in the control computer is made, but of course, the dealing store specifying information is not recorded in the computer 51 as in the case mentioned above, because the dealing store is not concerned. That is, in the control computer, the receipt number and the other information, such as the customer specifying information, the information on which the order is, the one for the simultaneous print processing, for the re-print, or for the development-only, the print specification information, the ordered frame specifying information, the number-of-print information for the ordered frames, the receipt date and hour, and the finish date and hour, are memorized in such a manner as to be made in the state of correspondence to each other.

Further, regarding the inputting and memorizing of the information in the control computer 51 in case where the above-mentioned seal capable of picking off is not put on the laboratory-inputted bar code slip 20c, the process similar to the above-mentioned is made. Regarding the inputting and memorizing of the information in the control computer 51 also in case where the information recorded on the laboratory-inputted bar code slip 20c is read in the dealing store to be memorized in an electronic recording medium, and this memorized information is transmitted to the large laboratory, or where the information is memorized in a portable recording medium to be delivered to the large laboratory, in the case of the former the transmitted information is received by the receiving means provided in the control computer 51 and memorized in it, and in the case of the latter the information recorded in the portable electronic recording medium is read by the information reading means for the portable electronic recording means provided in the control computer 51 and memorized in it.

Incidentally, on the basis of the print specification information and the dealing store specifying information (the information specifying the unmanned order receiving apparatus or facilities for the photographic processing or the customer specifying information in case of no dealing store specifying information) memorized in the control computer 51, the next spot fixing table as shown in Fig. for fixing the spot where the image-exposed but undeveloped photographic films or developed photographic films are supposed to be sent next in the large laboratory may be made by the control computer 51 and memorized in it. The numbers 80 and 91 indicate the number of the assorting apparatuses which will be described later, the number of seven figures at the left side indicates the receipt number, and the numbers 2, 4, 3, -----2, 1 noted under the number 80 in the upper portion of the table indicate the numbers defining the next sending spots, that is, the exposure apparatus and so forth, for the films to be assorted by the assorting apparatus, and further, the numbers 10, 21, 3, ------45, 38 noted under the number 91 in the upper portion of the table indicate the number specifying the next sending spots, that is, the returning spot (a dealing store, an individual, an unmanned order receiving apparatus or facilities for the photographic processing, and so forth) for the photographic film receiving sack packaging member to be assorted by the assorting apparatus. Then the information noted in this table will be utilized in the assorting apparatuses 80 and 91.

Figure 1:
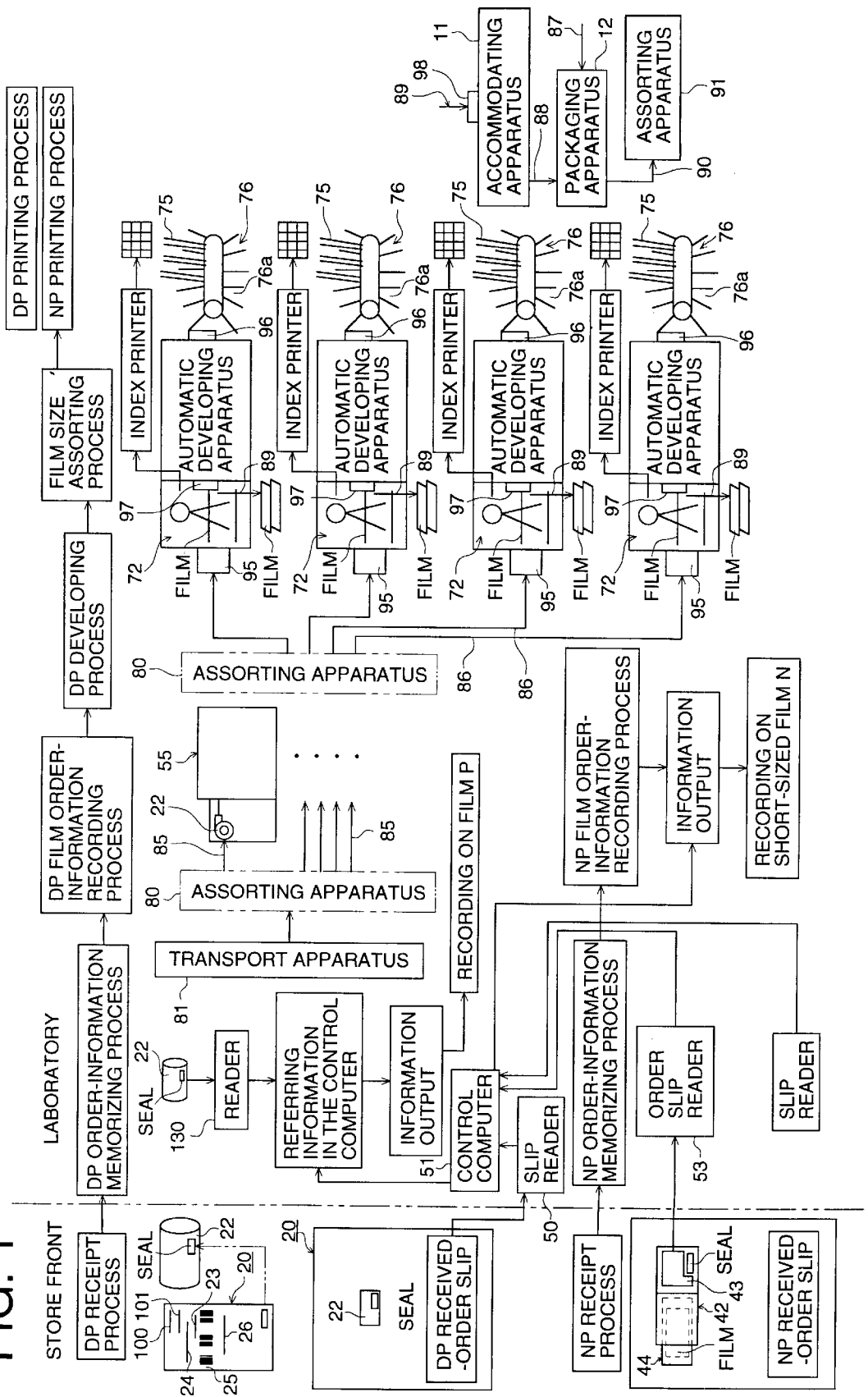
FIG. 1 is a drawing showing the outline of the structure of the photographic processing system.

The explanation about the memorizing process of the information in the control computer 51 shown in FIG. 1, which are carried out after the image-exposed but undeveloped photographic film or the developed film with which the customer requests the order for the processing is delivered to the large laboratory has now been completed.

From now on, the two methods of utilizing the information memorized in the control computer 51 in the large laboratory will be explained. The one is the method, as will be explained in the following, such that the information memorized in the control computer 51 is read, and recorded in the photographic film, with which the customer concerned with the read information has requested to make processing, and on the basis of this information recorded the photographic processing in the large laboratory is made. The other is the method, as will be explained later, such that the information memorized in the control computer 51 is read and supplied to the station of the photographic processing requiring the information, and in each processing station the photographic processing in the large laboratory is carried out on the basis of the required information. First, the former method of utilizing the information memorized in the control computer 51 in the large laboratory will be explained.

First of all, the explanation about the process that the information memorized in the control computer 51 is read, and recorded in the photographic film with which the customer concerned with the read information has requested to make processing will be given.

By the reader shown in FIG. 1, the receipt number recorded on the receiving container 22 of the image-exposed but undeveloped photographic film, the receiving sack packaging member 42, or the seal capable of picking off put on the photographic film receiving sack 44 is read, and this receipt number is transmitted to the control computer 51 which memorizes the information. The control computer to which the receipt number has been transmitted reads all bits of the necessary information memorized in the state of correspondence to the same receipt number as this receipt number together with the receipt number. The read information (the receipt number and the information memorized in the state of correspondence to the receipt number) is recorded in the non-image-recording area in the front end portion of the image-exposed but undeveloped photographic film (the part of an image-exposed but undeveloped photographic film fixed to the shaft of the spool in the receiving container 22 is regarded as the rear end portion.) which is received by the receiving container 22 on which the seal capable of picking off having the receipt number, which has been read to read this information, recorded on it, is put, or in the image-unrecorded area of the developed photographic film received by the receiving sack packaging member 42 or by the photographic film receiving sack 44 on which the seal capable of picking off having the receipt number, which has been read to read this information, recorded on it, is put (strictly speaking, in the case of the receiving sack packaging member 42, the photographic film received by the photographic film receiving sack 44 packaged in the receiving sack packaging member 42). Further, as described later, in order to utilize this information to be recorded as a division mark for every order unit, it is favorable that the position of recording of this information is an non-image-recording area, and at the same time a portion equivalent to the front end or rear end portion.

Figure 4:
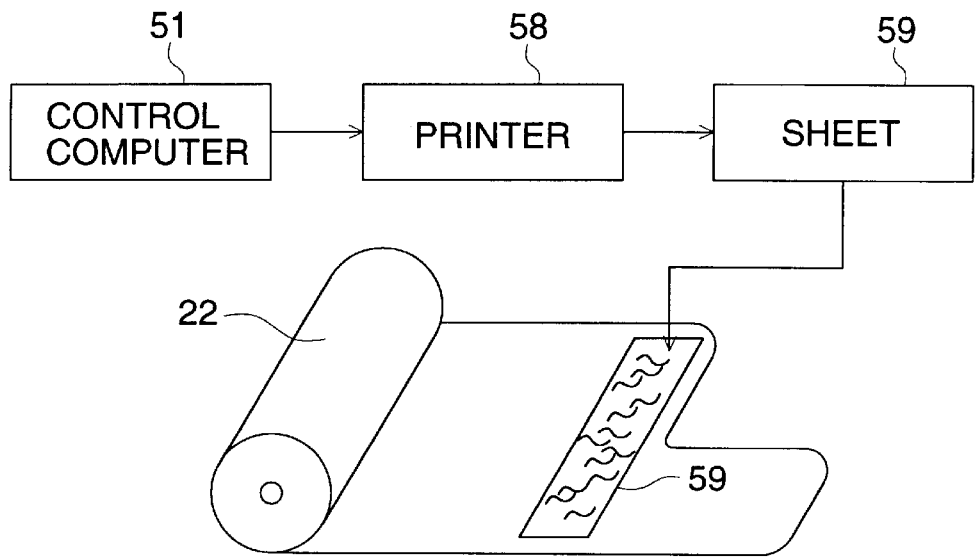
FIGS. 4(a) to 4(c) are drawing showing the method to record the information read.
Figure 4:
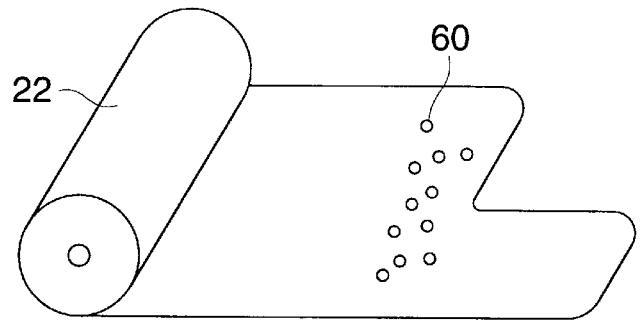
Figure 4:
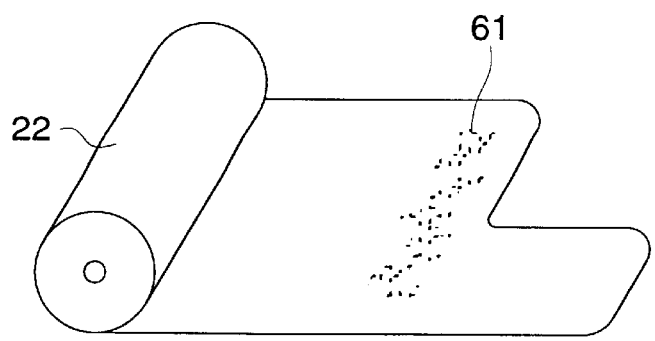

Regarding the method of recording this information, it is used a method shown in FIG. 4(a) such that the read information is recorded on a sheet as a two-dimensional bar code, and the sheet on which the bar code is recorded is put on the aforesaid image-unrecorded area in the front end portion of the image-exposed but undeveloped photographic film or on the image-unrecorded area of the developed photographic film. Further, as shown in FIG. 4(b), it is also used a method such that the read information is converted into the information of two dimensional positions of points, and these points are recorded in the above-mentioned image-unrecorded area in the front end portion of the image-exposed but undeveloped photographic film or on the image-unrecorded area of the developed photographic film as holes 60. Besides, as shown in FIG. 4(c), the read information is converted into the two dimensional image information, which is optically printed to produce a latent image in the unexposed image-unrecorded area in the front end portion of the image-exposed but undeveloped photographic film.

These bits of recorded information are also utilized as a division mark for every order unit of the photographic film. That is, when the detecting means of the information detects these bits of information, the result of detecting is utilized as the information indicating the end point of one order unit of the photographic film. Further, the information noted in the table shown in FIG. 5 may be utilized in place of the print specification information and the dealing store specifying information (the information for specifying the unmanned order receiving apparatus or facilities for the photographic processing or the customer specifying information in case of no dealing store specifying information).

The explanation about the recording process in the large laboratory of the information memorized in the control computer 51 is read, and recorded in the photographic film with which the customer concerned with the read information has requested to make processing has now been completed.

Regarding the above-mentioned image-exposed but undeveloped photographic film or the developed photographic film in which the read information is recorded, the former is subjected to the developing process by the developing apparatus 55, and the image frames of this developed and image-exposed photographic film are printed onto the photographic paper sheets by the exposure apparatus 72. Further, the latter, the developed photographic film is printed onto the photographic paper sheets by the exposure apparatus 72. Incidentally, in the large laboratory according to this embodiment of the invention, the exposure apparatuses 72 are provided, as shown in FIG. 1, at the stations corresponding to the plural print specifications. To state definitely, the exposure apparatus 72 to make exposure of the photographic paper for the specification EC (the uppermost exposure apparatus 72 in FIG. 1), the exposure apparatus 72 to make exposure of the photographic paper for the specification ESC (the second upper exposure apparatus 72 in FIG. 1), the exposure apparatus 72 to make exposure of the photographic paper for the specification LC (the second lower exposure apparatus 72 in FIG. 1), and the exposure apparatus 72 to make exposure of the photographic paper for the specification EC (the lowermost exposure apparatus 72 in FIG. 1) are provided. Further, in some cases, a particular exposure apparatus 72 carries out the exposure of the plural kinds of photographic papers of different specification. The image-exposed but undeveloped photographic films or the developed photographic films in which the read information is recorded, with the print specification information recorded in each detected and its next sending spot fixed as the exposure apparatus 72 for making the exposure of the photographic paper of the same print specification as the detected one, are subjected to the exposure process for its image frames by said exposure apparatus 72.

Because the above-mentioned photographic films in which the information read is recorded should be assorted for each of the print specifications in order that the exposure for their image frames may be done by the exposure apparatus 72 capable of exposing the photographic paper of the same print specification as the detected one, in the large laboratory according to this embodiment of this invention, the assorting apparatus is provided. The assorting apparatus in the photographic processing system is provided at two positions, of which one is the previous process of the developing apparatus 55, and the other is the process subsequent to the developing apparatus 55. Now, the system in the large laboratory in the former case where the assorting apparatus is provided at the preceding process of the developing apparatus 55 will be explained.

In this case, the above-mentioned image-exposed but undeveloped photographic films or the developed photographic films in which the read information is recorded are transported automatically to the assorting apparatus by a transporting apparatus not shown in the drawing. In the assorting apparatus, there is provided a judging means which judges selectively the print specification information and the information on which the order is, the one for the simultaneous print processing, for the re-print, or for the development-only. In this embodiment of the invention, this judging means is provided in the assorting apparatus, but it should not necessarily be provided in the assorting apparatus, for example, it may be provided in the aforesaid transporting apparatus. When the print specification information and the information on which the order is, the one for the simultaneous print processing, for the re-print, or for the development-only in the information recorded in the transported photographic films are read by this judging means, on the basis of this information, the assorting apparatus assorts the image-exposed but undeveloped photographic films or the developed photographic films having this read information. Regarding the assorting means, a course switching gate and so forth are available and some other appropriate method known to the public can also be used. The course switching gate distributes the photographic films to the EC course, the ESC course, the LC course, the LSC course, and the development-only course.

Now, regarding the way of assorting the photographic films, as for the ones for the simultaneous print processing, they are assorted to any one of the EC course, the ESC course, the LC course, and the LSC course in accordance with the detected print specification. As for the ones for the re-print processing, they are assorted to any one of the EC course, the ESC course, the LC course, and the LSC course in accordance with the detected print specification too. As for the ones for the development-only processing, they are assorted only to the development-only course.

The image-exposed but undeveloped photographic films for the simultaneous print processing assorted to any one of the EC course, the ESC course, the LC course, and the LSC course are transported automatically to the developing apparatus 55 by the transporting apparatus 85 provided in each course. The developing apparatus 55 is provided for each transporting apparatus 85 (in FIG. 1 only one developing apparatus 55 is shown for convenience, but actually five apparatuses are provided. One of them is provided for the developing of the undeveloped photographic films assorted to the development-only course.), and develops automatically the undeveloped photographic films transported by the transporting apparatus and discharges them outside.

The developed photographic films for the re-print processing assorted to any one of the EC course, the ESC course, the LC course, and the LSC course are transported automatically to the developing apparatus 55 by the aforesaid transporting apparatus 85. The developed photographic films transported to the developing apparatus 55 are made to pass through the transport path (not shown in the drawing) provided in the developing apparatus where no processing concerning the development is carried out and discharged automatically outside the developing apparatus 55.

Both the photographic films developed by the developing apparatus 55 and the photographic films only having passed the developing apparatus 55, both having been discharged outside the developing apparatus 55, are transported to the exposure apparatus 72 by the transporting means 86 which is provided for each developing apparatus 55 and transports the photographic films to the exposure apparatus 72 corresponding to the developing apparatus. For example, an undeveloped photographic film assorted to the EC course is developed and discharged by the developing apparatus 55, and then it is automatically transported to the exposure apparatus 72 capable of exposing the photographic paper of the print specification EC by the transporting means 86. Further, for example, a developed photographic film assorted to the LSC course is discharged outside the developing apparatus 55 and then it is automatically transported to the exposure apparatus 72 capable of exposing the photographic paper of the print specification LSC by the transporting means 86.

Moreover, the developed photographic films for the re-print processing assorted to any one of the EC course, the ESC course, the LC course, and the LSC course may be transported directly to the corresponding exposure apparatus 72 without being transported to the developing apparatus 55. In this case, it is favorable that the structure of the developing apparatus 55 is made easy. The image frames of the photographic films having been transported to the exposure apparatus 72 are subjected to the exposure process for the photographic paper according to the desired print specification. At some place between the entrance for the photographic film of the exposure apparatus 72 and the exposure stage the reading means 95 for reading the above-mentioned information recorded in the photographic film is provided, and the exposure apparatus 72 utilizes the information that this reading means 95 has read the above-mentioned information recorded in the photographic film, as the information indicating the end of one order unit of the photographic film.

Besides, if the print specification having been read by the reading means 95 is different from that defined for the exposure apparatus 72, it expresses the occurrence of an error by the error expressing means for informing that an error has occurred, and it executes the process to discharge the photographic film which has caused the error to occur so as not to carry out the printing of this photographic film.

Further, for the photographic film which is judged to be the one of the order for the re-print processing, the exposure apparatus 72 carries out the exposure desired number of times for the ordered frames on the basis of the ordered frame specifying information and the number-of-print information for the ordered frames. Regarding the photographic film of which the printing has been finished, the exposure conditions by this exposure apparatus 72 are recorded for every order unit by the exposure condition recording means provided in the exposure apparatus 72. However, this exposure condition recording means should not necessarily be provided in the exposure apparatus 72, and for example, it may be provided in the accommodating apparatus or in the packaging apparatus described later. This recorded exposure condition is utilized when the exposure with this photographic film is carried out next time in this large laboratory.

The photographic film which is subjected to the exposure process for the first time in this photographic processing system according to this embodiment can be subjected to the exposure process on the above-mentioned first conditions from this time on, if the exposure process is carried out in the same photographic processing system as this. By doing this, the printed images obtained this time by the exposure process based on this photographic film and those to be obtained next time by the exposure based on this film will have almost the same image quality. As for the exposure condition recording means, it is used a means to put a sheet on which the exposure conditions are recorded on the photographic film. However, in case where the exposure condition recording means is provided in the later-described accommodating apparatus or in the packaging apparatus, the sheet on which the exposure conditions are recorded by this means is to be put on the photographic film receiving sack.

In this embodiment of the invention, the exposure apparatus 72 is loaded with a long roll of photographic paper, and on the occasion of exposure the photographic paper is exposed as it is. Further, the photographic paper is given the end-of-order-unit information, and developed and discharged by the automatic developing apparatus 73. The discharged long roll of photographic paper is cut for each frame by the cutting apparatus 96 provided in the vicinity of the discharging potion of the long roll of the automatic cutting apparatus 73. In the cutting apparatus 96 there is provided a detecting means for detecting the end-of-order-unit information and a counter for the frames which have been cut, and both the detect information from this detecting means and the number of counts from the counter are sent to the sorter 76 having plural bins 76a provided in the vicinity of the cutting apparatus 96; the sorter 76, having received this detect information and the number of counts, controls the position of bins to receive every order unit of the photographic paper 75 in each of bins 76a on the basis of these bits of information.

When the recording of the exposure conditions is finished, the long-sized photographic film is cut to make cut film pieces by a cutting means (not shown in the drawing) provided in the exposure apparatus 72. In the cutting means there is provided a judging means for selectively judging the information on which the order is, the one for the simultaneous print processing, for the re-print, or for the development-only, and the judging means discriminates the photographic film of the order for the simultaneous print processing to cause it to be cut to make the cut film pieces. Thus all the films discharged from the exposure apparatus 72 have been made to be in the state of cut film pieces.

The cut film pieces discharged from the exposure apparatus 72 is automatically transported, by the transporting apparatus 89 provided at the discharging portion of the cut film pieces of each exposure apparatus 72, to the accommodating apparatus for making the photographic film receiving sack receive the cut film pieces provided in each of the transporting apparatus 89. At the entrance for the photographic film of the accommodating apparatus there is provided a reading means for reading the above-mentioned information recorded in the photographic film, and the accommodating apparatus utilizes the information that this reading means has read the above-mentioned information recorded in the photographic film as the information indicating an end of the order unit. The cut film pieces transported to the accommodating apparatus are received by the photographic film receiving sack, with each order unit received in a sack.

The above-mentioned prints of one order unit received by a sorter bin 76a of the sorter 76 and the above-mentioned cut film pieces of one order unit received by the photographic film receiving sack are transported, by the transporting means 87 provided at each sorter 76 and transporting means 88 provided at each accommodating apparatus 11 respectively, to the packaging apparatus 12 which packages the prints of one order unit and the cut film pieces of one order unit in a receiving sack packaging member. In this embodiment of the invention, five packaging apparatuses 52 for the EC, ESC, LC, LSC, and development-only courses (In the drawing only one is shown.) are provided. The prints of one order unit and the cut film pieces of one order unit received by the photographic film receiving sack are transported with the order maintained as it is at printing in the exposure apparatus 72, hence the packaging apparatus packages the prints of one order unit and the cut film pieces of one order unit received by the photographic film receiving sack in the order of being transported and in the state of correspondence. That is, the photographic film and the photo-prints belonging to a particular order unit are made to be in the state of correspondence.

The undeveloped photographic films distributed to the development-only course by the above-mentioned assorting apparatus are automatically transported by the transporting apparatus 85 to the developing apparatus 55 which is provided at and proper to this transporting apparatus 85. The developing apparatus 55 develops the image-exposed photographic films transported by this transporting apparatus 85 and discharges them outside. The discharged long-sized photographic films are cut by the cutting apparatus (not shown in the drawing) provided adjacently to the developing apparatus to make cut film pieces having the predetermined number of frames. The cut film pieces discharged from the cutting apparatus are automatically transported, by the transporting apparatus provided at the discharging portion for the cut film pieces of the cutting apparatus, to the accommodating apparatus 11 which makes the photographic film receiving sack receive the cut film pieces. At the entrance for the photographic film of the accommodating apparatus, there is provided a reading means for reading the aforesaid information recorded in the photographic film, and the cutting apparatus utilizes the information that this reading means has read the above-mentioned information recorded in the photographic film as the information indicating the end of one order unit. The cut film pieces transported to the accommodating apparatus 11 are received by the photographic film receiving sacks, with each order unit contained in each sack.

These cut film pieces of one order unit received by the photographic film receiving sack are transported, by the transporting apparatus provided at the accommodating apparatus, to the packaging apparatus which packages the cut film pieces of one order unit received by the photographic film receiving sack in the receiving sack packaging member in the order of being transported. Further, in case of intending to reduce the five packaging apparatus 12 for the EC, ESC, LC, LSC, and development-only courses in view of the space for installation and the cost of the apparatuses, it is appropriate to record the same number on some of the photographic paper sheets in one order unit as the receipt number recorded in the photographic film on which the making of these photo-prints is based, further to read the receipt number recorded in one of the cut film pieces and the receipt number recorded on one of the prints by the reading means provided at the packaging apparatus 12, then to make the prints of one order unit and the cut film pieces of one order unit received by the photographic film receiving sack to be in correspondence, that is, to make the photographic film and the prints belonging to a particular order unit to be in correspondence. The recording of the receipt number on some of the prints of one order unit may be done in a manner such that the receipt number is transmitted from the reading means of the exposure apparatus 72 to the cutting apparatus 96 provided in the vicinity of the discharging portion for the long roll of the photographic paper of the automatic developing apparatus 73, and recorded by the recording means provided at the cutting apparatus 96. Further, the recording of the receipt number on some of the prints of one order unit should not necessarily be made directly on the print, but it will do to record it on some recording medium transported together with the prints of one order unit.

All the receiving sack packaging members, which package the photo-prints of one order unit and the cut film pieces of one order unit received by a photographic film receiving sack or the cut film pieces of one order unit received by a photographic film receiving sack, are transported to the assorting apparatus 91 which assorts these receiving sack packaging members separately according to their returning spots, by the transporting apparatus 90 provided adjacently to each packaging apparatus 12. In the assorting apparatus 91 there is provided a reading means for reading selectively the dealing store specifying information recorded on the photographic film packaged in the receiving sack packaging member (in case of no dealing store specifying information, the information specifying the unmanned order receiving apparatus or facilities for the photographic processing, or the customer specifying information; these bits of information function as the returning spot specifying information.).

In this embodiment of the invention, this judging means is provided in the assorting apparatus, but it should not necessarily be provided in the assorting apparatus; it may be provided, for example, in the aforesaid transporting apparatus. In case, for instance, where the dealing store specifying information (the information for specifying the unmanned order receiving apparatus or facilities for the photographic processing or the customer specifying information, in case of no dealing store specifying information) in the information recorded on the photographic film is read by this reading means, the assorting apparatus 91 distributes the receiving sack packaging members having the read information to the corresponding course. As for the assorting means, in this embodiment of the invention some course switching gate (not shown in the drawing) is used, however, any well known means can be appropriately selected. The course switching gate is made up in a manner such that it can switch to the plural courses of which the number is the number of the dealing stores plus two, and each course is assigned to each corresponding dealing store. Further, these added two courses are for returning the receiving sack packaging member to the customer directly from the large laboratory to the customer through no dealing store, or through the unmanned order receiving apparatus or facilities for the photographic processing, in case where the dealing store specifying information has not been read by the reading means, that is, in case where the customer requests the order for the photographic processing directly through no dealing store to the large laboratory. Thus the receiving sack packaging members assorted to each course are transported by the transporting means provided at the exit of each switched course of the switching gate to be accommodated by the receiving box for returning provided at the downstream-in-transport portion of the transporting means, and afterwards they are returned to the returning spots such as the dealing stores.

In addition, in case where the photographic films are packaged in a manner such that the information recorded on the photographic film is difficult to read by the above-mentioned reading means, a reading means for reading the information recorded on the photographic film is provided in the above-mentioned accommodating apparatus or in the above-mentioned packaging apparatus, and further it may be appropriate to provide a recording means for recording this information read, in particular, the receipt number and the returning spot specifying information, on the photographic film receiving sack or on the receiving sack packaging member.

Next, the photographic processing system in case where the assorting apparatus is provided in the process subsequent to the developing apparatus 55 will be explained. In this case, the above-mentioned image-exposed but undeveloped photographic films or the developed photographic films, on which the read information is recorded, are automatically transported to the developing apparatus 55 by the transporting apparatus 81. In this case, an appropriate number of developing apparatuses 55, at least one or more, are installed. In the developing apparatus there is provided a judging means (not shown in the drawing) for judging selectively the information on which the order is, the one for the simultaneous print processing, for the re-print, or for the development-only. The developing apparatus 55 automatically develops and discharges the image-exposed but undeveloped photographic films or the developed photographic films judged as the ones of the order for the simultaneous print processing or for the development-only. On the other hand, the developed photographic films judged by the judging means as the ones for the re-print processing are made to pass through the transport path (not shown in the drawing) where no processing concerning development is carried out and discharged outside the developing apparatus 55.

The photographic films developed and discharged outside by the developing apparatus 55 and the already developed photographic films made to pass through the path of the develop ing apparatus where no processing concerning development is carried out are automatically transported to the assorting apparatus 80 by the transporting apparatus provided adjacently to the discharging portion for the photographic film of the developing apparatus 55. In the assorting apparatus there is provided a judging means for selectively judging the print specification information and the information on which the order is, the one for the simultaneous print processing, for the re-print, or for the development-only recorded on the photographic film.

In this embodiment of the invention, this judging means is provided in the assorting apparatus 80, but it should not necessarily be provided in the assorting apparatus 80; it may be appropriate to provide it, for example, in the abovementioned transporting apparatus 81. Further, in the assorting apparatus 80 the course switching gate is used as the assorting means. In addition, any appropriate well known means may be selected for the assorting means. The course switching gate is made up in a manner such that it can switch to the plural courses, of which the number is the number of the print specifications plus one. As for the manner of assorting the photographic films, the photographic films which are judged as the ones of the order for the simultaneous print processing or for the re-print processing by the judging means are distributed to the separate courses by the course switching means according to the print specification. In this embodiment of the invention, the four kinds of print specification, EC, ESC, LC, and LSC are present, therefore, the photographic films are distributed to the four courses corresponding to the print specification. On the other hand, the photographic films judged by the judging means as the ones of the order for the development-only processing are distributed to the course for the development-only processing by the course switching gate. The photographic films distributed to each of the EC, ESC, LC, and LSC courses are automatically transported to the exposure apparatus 72 corresponding to each course by the transporting apparatus (not shown in the drawing) provided in the vicinity of each exit of the course switching gate.

The explanation about the processing subsequent to this of the photographic films transported to the exposure apparatus 72 or the photographic films distributed to the course for the development-only processing is omitted, because they are similar to the processing in case where the assorting apparatus is provided in the process preceding the developing apparatus 55.

Up to now, the method such that the information memorized in the control computer 51 is read, the information is recorded in the image-exposed but undeveloped photographic film or in the developed photographic film with which the customer concerned with the read information has requested the processing, and the photographic processing in the large laboratory is carried out on the basis of this recorded information, has been explained.

Next, the explanation will be given about the method such that the information memorized in the control computer 51 is read, and it is supplied to the station for the photographic processing requiring the information, where the photographic processing in the large laboratory is carried out on the basis of the necessary information. Further, the explanation will be given in the following, with the repetition of the already given explanation about the method avoided which is such that the information memorized in the control computer 51 is read, the information is recorded in the image-exposed but undeveloped photographic film or in the developed photographic film with which the customer concerned with the read information has requested the processing, and the photographic processing in the large laboratory is carried out on the basis of this recorded information.

In the method already described, it is read the information which is memorized in the control computer 51 in the state of correspondence to the receipt number recorded on the receiving container 22 of the image-exposed but undeveloped photographic film, the receiving sack packaging member 42, or the seal capable of picking off put on the photographic film, and recorded in the undeveloped or developed photographic film. However, in this method, the same receipt number as that recorded on the receiving container 22 of the image-exposed but undeveloped photographic film, the receiving sack packaging member 42, or the seal capable of picking off put on the photographic film is recorded on the undeveloped photographic film or the developed photographic film received by the receiving container 22 of the image-exposed but undeveloped photographic film, the receiving sack packaging member 42, or the photographic film receiving sack 44. In the process of the large laboratory requiring the information memorized in the control computer 51, the receipt number recorded on the undeveloped or developed photographic film is read and transmitted to the control computer 51, where the information memorized in the control computer 51 in the state of correspondence to this receipt number is read and transmitted to the process requiring the information to be utilized. Further, it is favorable that, to each process in the large laboratory, the only information required by the process is transmitted. As for the process in the large laboratory requiring the information memorized in the control computer 51, the following are cited: the process judging the information on which the order is, the one for the simultaneous print processing, for re-print, or for development-only, the process judging the print specification, the process requiring the ordered frame specifying information and the number-of-print information for the ordered frames in the case of the order for the re-print processing, and the process judging the returning spot of the products of which the processing ordered has been finished.

Now, it has been finished the explanation about the method such that the information memorized in the control computer 51 is read, and it is supplied to the station for the photographic processing requiring the information, where the photographic processing in the large laboratory is carried out on the basis of the necessary information.

Figure 6:
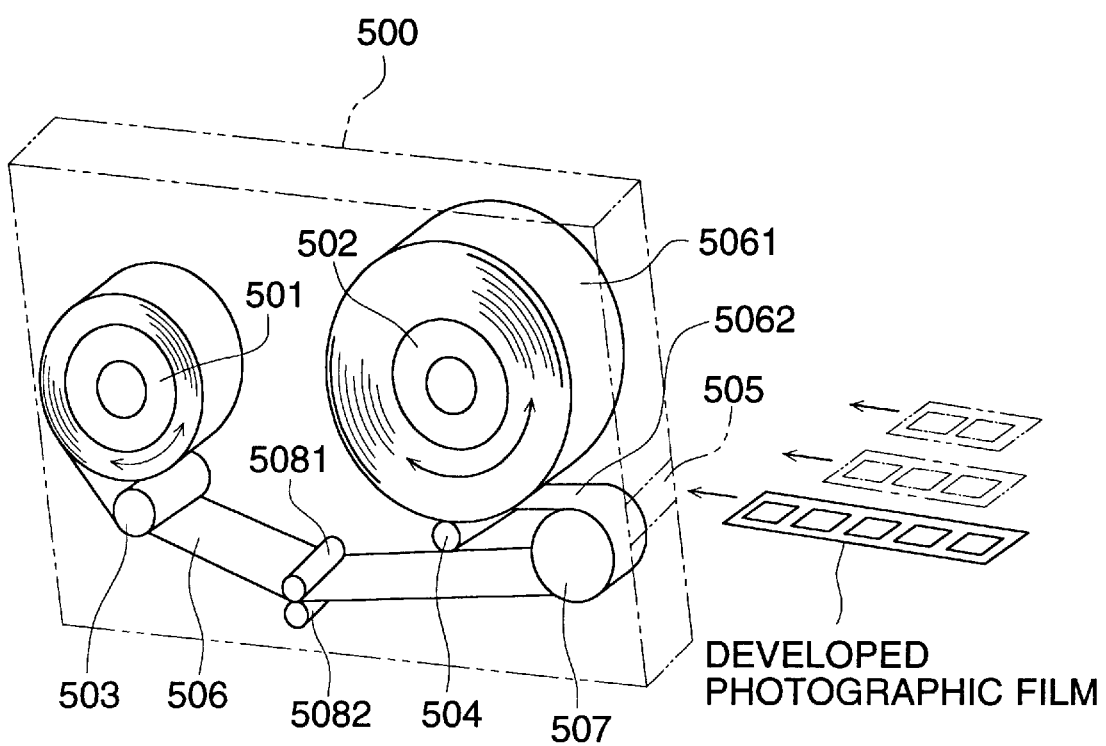
FIG. 6 is a drawing showing how the developed photographic film pieces are transported and received by the photographic film receiving means to form the film assembly composed of the plural order units of the developed photographic film pieces.
Figure 7:
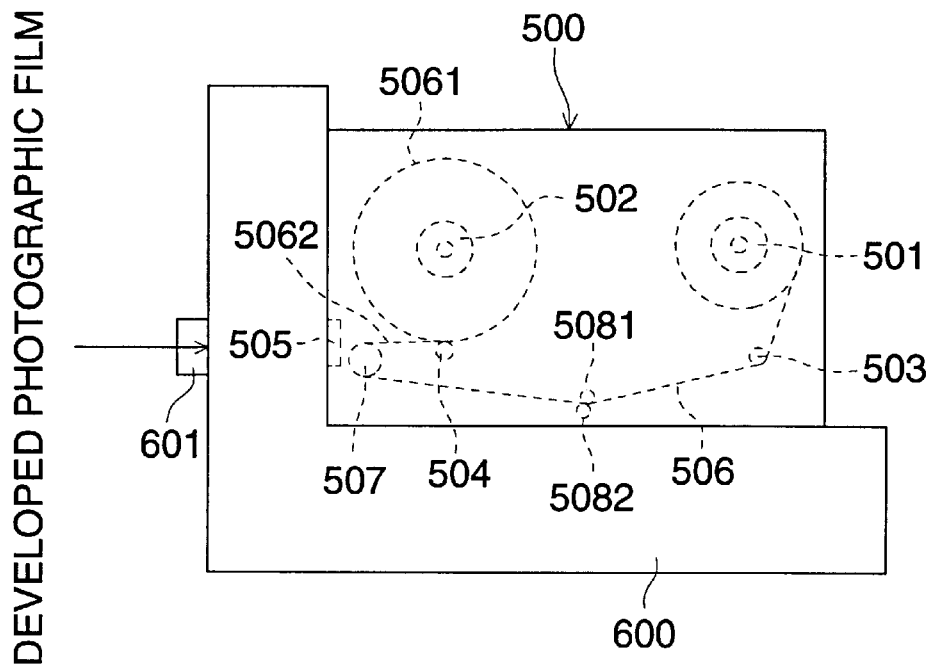
FIG. 7(a) is a drawing showing the drive means for feeding the developed photographic film pieces in the photographic film receiving means mounted with the receiving means.
FIG. 7(b) is a drawing showing the drive means for taking out the developed photographic film pieces received by the photographic film receiving means and feeding them to the exposure apparatus mounted with the photographic film receiving means.
Figure 7:
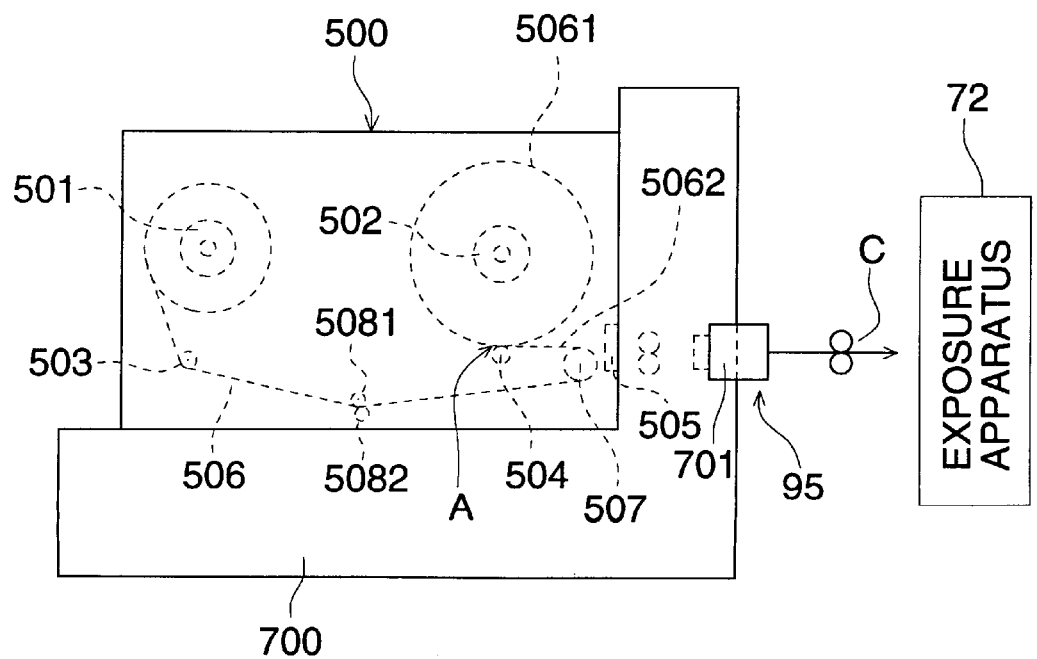

Now, in the foregoing explanation, the developed photographic films of the order for the simultaneous print processing distributed to each of the courses EC, SEC, L.C., and LSD, and the developed photographic films of the order for the simultaneous print processing and those for the re-print processing are automatically transported to each exposure apparatus 72 capable of exposing the photographic paper of the corresponding specification, or they may be received by the photographic film receiving means 500 as shown in FIG. 6 to form film assemblies of the developed photographic films composed of plural order units of them and transported. The receiving means of FIG. 6 can receive a short cut piece of, for example, two frames. FIG. 7(a) shows the driving means for receiving the photographic film 600 to make the photographic film receiving means 500 receive the developed photographic films mounted with the photographic film receiving means 500, and FIG. 7(b) shows the driving means for taking out the photographic film 700 to take out the developed photographic films received by the photographic film receiving means 500 to feed them to the exposure apparatus 72 mounted with the photographic film receiving means 500.

The developed photographic films transported by the transporting apparatus are put into the photographic film receiving means 500 from the entrance/exit for the photographic film 505 of the photographic film receiving means 500 through the entrance for the photographic film 601 of the driving means for receiving the photographic film 600.

In the photographic film receiving means 500, there are provided the take-up core for the photographic film 502 and the take-up core for the winding belt 501. The winding belt 506 is wound round the take-up core for the winding belt 501 with its one end fixed to the take-up core for the winging belt 501.

On the other hand, the other end of the winding belt 506 is guided through the guide rollers 503 and 507 to the take-up core for the photographic film 502, where it is fixed to the core; the photographic films inserted between the outside surface 5061, with regard to the take-up core for the photographic film 502, of the winding belt 506 and its inside surface 5062, both facing to each other, are wound round the core held between the belt surfaces. The pressing roller 504 is urged toward the center of the take-up core for the photographic film 502 to clamp the developed photographic film F inserted between the outside surface 5061 and the inside surface 5062.

The driving means for receiving the photographic film 600 makes the photographic film receiving means 500 receive the developed photographic films to make each of them form a roll by rotating the take-up core for the photographic film 502 and the take-up core for the winding belt 501 clockwise in FIG. 6. By using such method of winding the photographic films as above-mentioned, the photographic film receiving means 500 can receive short cut pieces, for its extreme example, with the length not longer than 9 cm of the developed photographic film; in FIG. 6, the rolling up of the cut piece of the developed photographic film F, for example, with five frames is shown, but shorter cut pieces of the developed photographic film F can be rolled up. Also the cut pieces of the developed photographic film with two or three frames can be favorably received and discharged.

It is favorable that (it is natural that even if a photographic film accommodating means other than photographic accommodating means 500 is used), in order to make it easy to make the unit of exposure processing correspond to the order unit, the unit of receiving the film by the photographic film receiving means 500 is made to be the order unit, hence in the case of the order for the re-print processing all the cut pieces of the developed photographic film belonging to a particular order are received regardless of the presence of the ordered frames. For that purpose, it may be appropriate that a reading means for reading the information recorded in the photographic film is provided in the driving means for receiving the photographic film 600, and by utilizing the information that the reader has read said information as an end-of-order information, the developed photographic films are received by the photographic film receiving means 500 in a manner such that the unit of receiving corresponds to the order unit. In this occasion, developed films in which information for the separation of each order has been recorded is taken out from a film accommodating means, it is favorable that they are taken out firstly or finally among developed photographic films belonging to one order. In other words, it is preferable that the film accommodating means forms a film aggregate in such a manner that they functions explained as above. Further, it is favorable that cut or full-sized pieces of the developed photographic films are rolled up in the photographic film receiving means 500 in a manner such that they do not overlap one another in order that they may not be damaged. For this purpose, it may be appropriate that a detecting means is provided in the transport path for the developed photographic films in the driving means for receiving the photographic film 600, and the transporting means for the photographic film receiving means 500 is controlled to transport the developed photographic film pieces with an interval into the photographic film receiving means 500 on the basis of the detect information from the detecting means. Further, for the purpose of keeping this interval constant, it may be appropriate too that a pair of holding rollers 5081 and 5082 is provided at a position between the guide rollers 503 and 507 to hold the winding belt at the position and the driving of the pair of holding rollers 5081 and 5082 is controlled to make the rotation speed constant so that the velocity of the rolling up of the developed photographic film piece at the position A (lying on the outermost surface of the winding belt 506 wound round the take-up core for the photographic film 502) in FIG. 7(b) described later may be constant.

Besides, the photographic film receiving means 500 can receive the developed photographic films of the order for the simultaneous print processing and those for the re-print processing mixedly, however, in some exposure apparatuses the settings are made to be different for the simultaneous print processing and the re-print processing from each other and it may be considered that in some large laboratory systems separate exposure apparatuses are used for the simultaneous print processing and the re-print processing respectively, accordingly in order to reduce the number of the exposure apparatus and in view of the system structure it is desirable that the photographic film receiving means 500 receives the developed photographic films of the order for the simultaneous print processing and those for the re-print processing in a manner such that both are not mixed but present separately. For this purpose, it may be appropriate that before the developed photographic films are transported to the driving means for receiving the photographic film 600, they are judged by the a reading means for reading the aforesaid information recorded on the photographic film concerning whether each of the developed photographic films is the one for the simultaneous print processing or the one for the re-print processing to distribute them into the group for the simultaneous print processing and into that for the re-print processing, and then the distributed developed photographic films are received by the photographic film receiving means 500.

Now, the developed photographic films received by the photographic film receiving means 500 are fed to the exposure apparatus 72 through the exit for the photographic film 701 of the driving means for taking out the photographic film 700. When the photographic films are fed to the exposure process, the driving means for taking out the photographic film 700 takes out them by rotating the take-up core for the photographic film 502 and the take-up core for the winding belt 501 counter clockwise in FIG. 6 to take out the developed photographic films from the photographic film receiving means 500 to feed them to the exposure apparatus 72. The driving means for taking out the photographic film 700 is mounted to the exposure apparatus 72; as for the developed photographic films passing through the driving means for taking out the photographic film 700, the aforementioned information recorded in them (the receipt number in case where the information memorized in the control computer 51 is read and it is supplied to the station for the photographic processing requiring the information, where the photographic processing is carried out on the basis of the necessary information) are read by the reading means 95 of the exposure apparatus 72.

All the cut pieces of a developed photographic film of the order for the re-print processing belonging to a certain order unit are fed to the exposure apparatus regardless of the presence of the ordered frames, and made to come to the exposure station for carrying out the exposure for printing and the ordered frames are subjected to the exposure process. Further, for the purpose of increasing the number of prints produced per hour by the exposure apparatus 72, it may be appropriate that the cut film pieces having no ordered frame among the cut film pieces fed to the exposure station 72 are made to pass through the other path, later to get together with the cut pieces of the developed photographic film having the ordered frames belonging to the same order unit.

Incidentally, in order to transport the photographic film pieces with a high reliability from the photographic film receiving means 500 to the exposure apparatus 72 by giving the film pieces a sufficient transporting force, it is favorable that the intervals of the press-to-contact position of the developed photographic film pieces taken out of the position between the outside surface 5061 and the inside surface 5062 (the position A in FIG. 7(b)), the position where the force for transporting the developed photographic film pieces is applied on the transport path to the exposure apparatus in the driving means for taking out the photographic film 700 (The position B. It is single in FIG. 7(b) but may be plural.), and the position where the force for transporting the developed photographic film pieces is applied on the transport path of the developed photographic film pieces fed from the driving means for taking out the photographic film 700 in the exposure apparatus 72 (the position C in FIG. 7(b)), that is, the interval between A and B and the interval between B and C are shorter than the length of the shortest cut film piece. In a path (including a conveyance path in an exposure device and other devices), it is preferable that a mechanism is provided in such a manner that favorable conveyance is conducted) in which a developed photographic film fed from the photographic film housing means (which forms a film aggregate) is conveyed, In the above-mentioned, an example is shown in which the photographic film pieces of the plural order unit are received by the photographic film receiving means 500 as shown in FIG. 6 to form a film assembly, however the photographic film receiving means is not confined to this and any other appropriate photographic film receiving means may be used to receive the developed photographic film pieces to form a film assembly. The other photographic film receiving means, the receiving of the developed photographic film by it, and the method of feeding the developed photographic film from it to the exposure apparatus 72 will be explained with reference to FIG. 8.

The photographic film receiving means 800 shown in FIG. 8(a) receives the developed photographic film pieces in the photographic film receiving portion 802 for receiving the developed photographic film pieces. Here an example of the photographic film receiving means 800 capable of receiving the developed photographic film pieces of the order for the reprint processing, in particular, short-sized cut pieces of the developed photographic film is shown, but by elongating the length of the photographic film receiving means 800 in the direction of the arrow mark at FIG. 8(a)(1), the developed photographic film pieces having a length longer than this, even the full-sized developed photographic film pieces can be received too. In the photographic film receiving means 800 there is provided the entrance for the photographic film 801, where the developed photographic film pieces are let in and out.

FIG. 8(a) shows the driving means for receiving the photographic film 900 which makes the photographic film receiving means 800 receive the developed photographic film pieces mounted with the photographic film receiving means 800. As for the photographic film receiving means 800, the cross-sectional view in the directions of the arrow marks at FIG. 8(a) (2) is shown. In the transport path 902 for the developed photographic film pieces in the driving means for receiving the photographic film 900, there is provided the transport roller 901 which is rotated by a drive source not shown in the drawing to make the developed photographic film pieces to be received in the photographic film receiving portion 802 of the photographic film receiving means 800. Further, it is favorable that in the photographic film receiving portion 802, the photographic film pieces are received in such a manner as to be put aside to the entrance for the photographic film 801. For this putting aside, it may be appropriate that some means for putting aside is provided in the photographic film receiving means 800.

Figure 8:
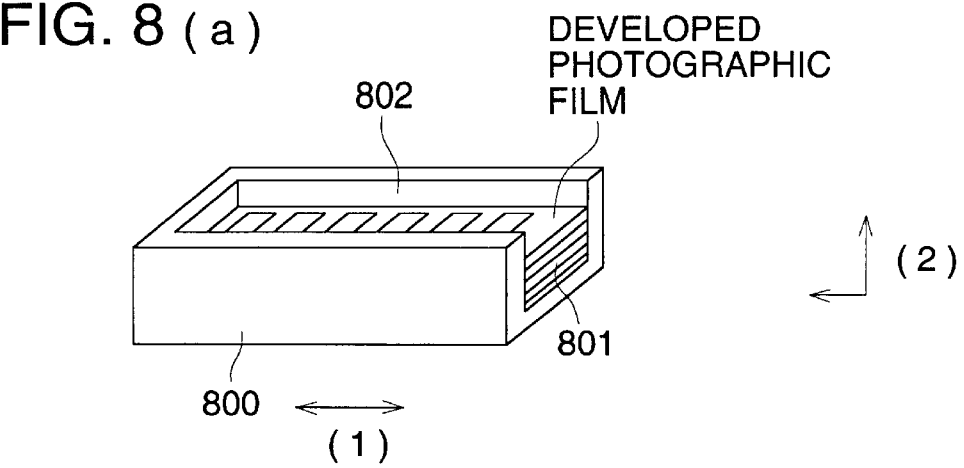
FIGS. 8(a) to 8(c) are drawing showing how the developed photographic film pieces are received and fed to the exposure apparatus.
Figure 8:
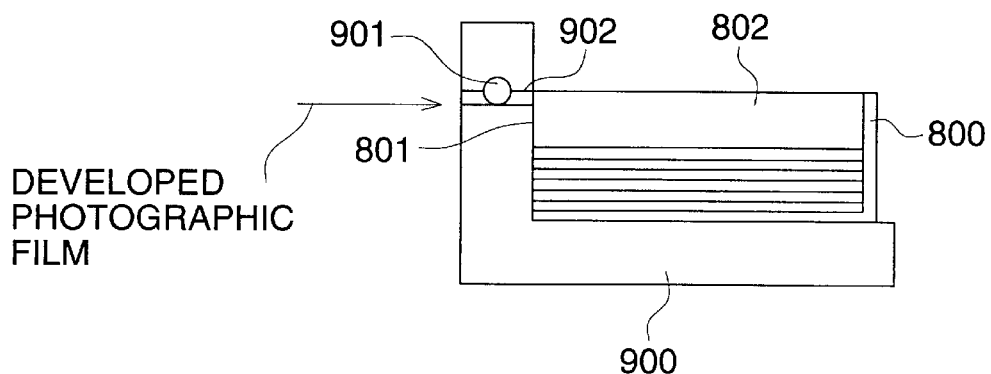
Figure 8:
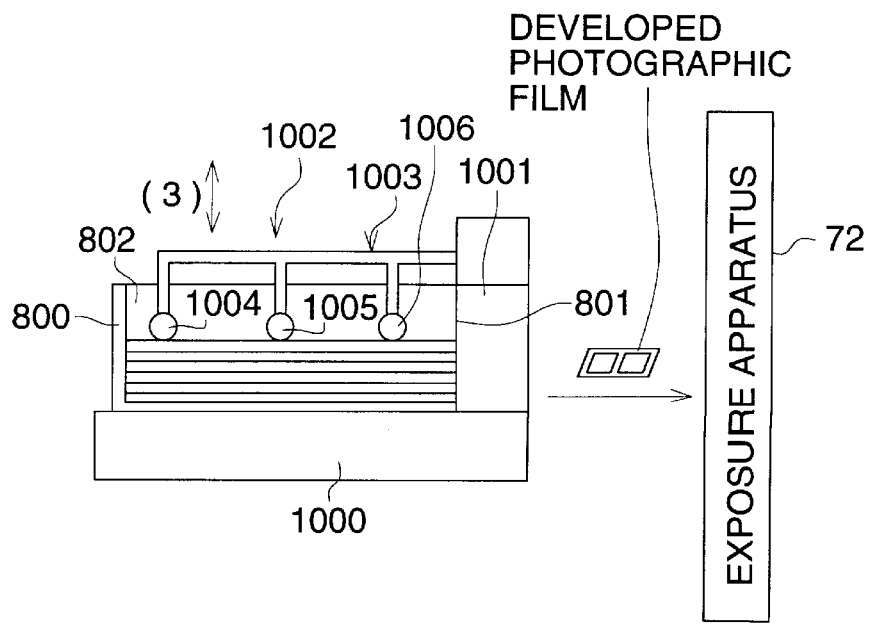

FIG. 8(c) shows the driving means for feeding the photographic film 1000 which feeds the developed photographic film pieces to the exposure apparatus 72, mounted with the photographic film receiving means 800 having received the developed photographic film pieces. In the driving means for feeding the photographic film 1000, there is provided the photographic film taking out member 1002 which moves up and down in the direction of the arrow mark at FIG. 8(c)(3) and has the arm portion 1003 and the transport rollers 1004, 1005 and 1006. The up-and-down position of the arm portion 1003 in the direction of the arrow mark at FIG. 8(c)(3) is controlled in a manner such that the transept rollers 1004, 1005, and 1006 contact to press the developed photographic film pieces with a predetermined force. The rollers 1004, 1005, and 1006 (in this example, three rollers are provided but any suitable number for the rollers can be selected) are placed with the intervals capable of transporting short cut pieces of the developed photographic films, with each of the intervals made shorter than the length of the shortest cut piece of the developed photographic film to be received by the photographic film receiving means 800. Further, the transport rollers 1004, 1005, and 1006 are rotated by a drive source not shown in the drawing to feed the developed photographic film pieces to the exposure apparatus 72 from the photographic film receiving portion 802 through the transport path of the driving means for feeding the photographic film 1000. Still further, it may be appropriate that only the rollers 1005 and 1006 or only the roller 1006 is made to be rotated by the drive source in accordance with the length of the photographic film piece in order to prevent double feed of the photographic film pieces in case of discharging the photographic film pieces having the five or less frames, because the developed photographic film pieces are received in such a manner as they are put aside to the entrance for the photographic film 801. In the above-mentioned explanation, a developed photographic film is accommodated in film accommodating means 500 and 800 for forming a film aggregate as shown in FIGS. 6 and 8. However, not limiting to the above, if there is provided a film accommodating means which accommodates developed photographic film and which can rewound mechanically, it is allowed that the developed photographic films are accommodated for forming a film aggregate. For example, it is allowed to form a film aggregate by the use of a film accommodation means (cartridge c.) described in Japanese Tokkaisho 56-42227.

In the foregoing explanation, the photographic film is used for the recording medium having an image recorded but it is not confined to this and some recording medium having an image electronically recorded may be used. For instance, an electronic recording medium with an electronic image taken by an electronic imaging camera recorded may be handled in the same way as the developed photographic film, or an electronic recording medium, in which an image recorded in the developed photographic film of the order for the simultaneous print processing or the developed photographic film of the order for the re-print processing is electronically photographed and recorded, may also be handled in the same manner as the developed photographic film of the order for the simultaneous print processing or the developed photographic film of the order for the re-print processing. However, in these cases, for the exposure apparatus it is used the one that can make print processing on the basis of the electronic recording medium. Further, in such a case as above, the information on whether the frame-images recorded in the photographic film are to be recorded in the electronic recording medium or not, and the information on which frame-images among the plural frame-images recorded in the photographic film are to be recorded in the electronic recording medium are recorded on the aforesaid received order slip 20 and the receiving sack packaging member 42, and these bits of the recorded information are utilized in the large laboratory in the same manner as the aforedescribed information recorded on the received order slip 20 and the receiving sack packaging member 42.

Now, although being omitted in the foregoing explanations, it may be appropriate that the information memorized in the control computer 51 and the information recorded on the photographic film, and the results of each process and so forth are recorded on the recording medium shown in FIG. 9 and this recording medium is made to be returned together with the developed photographic film and the photo-prints which are the products processed and produced through every process. In FIG. 9 an embodiment of the recording medium is shown. As for the recording medium, no particular limitation is applied but any one that can record expressly letters and images are available without problem and it is favorable that the material is fit for the recording characteristics of the recording apparatus, for example, papers used in the recording apparatus of the ink jet method or the electrophotographic method, pressure-sensitive papers, and heat-sensitive papers and so forth are cited.

As for the information to be recorded on the abovementioned recording medium, the following are noted: the information concerning the processing of the photographic film, that is, the dealing store specifying information, the customer specifying information (the name of the customer and the telephone number in FIG. 9), the information on which the order is, the one for the simultaneous print processing, for the re-print, or for the development-only, the print specification information, the ordered frame specifying information, the number-of-print information, the information indicating the number of exposures of the photographic film, the information on the charge for the photographic processing, the date and hour of receipt, the date and hour of finish, and so forth.

In this embodiment of the invention, papers as the examples of the recording medium are shown, but it is not confined to them, and the information may be recorded in an electronic recording medium (for example, such as a floppy disc and a mini-disc).

This recording medium with the information recorded on it should be combined with the developed photographic film and photo-prints before leaving the large laboratory, and it is favorable that it is combined before the assorting process by the aforesaid assorting apparatus 91, and further it is more favorable for them especially to be put together in the packaging process from the view point of the simplicity of the system. Further, the collation of the developed photographic film and the photo-prints with this recording medium may be made by reading the receipt number recorded in them by the aforesaid reading means provided in the packaging apparatus 12.

In the following, the method of producing this information-recorded medium will be explained. Mainly, the method of producing the information-recorded medium in case where the information memorized in the control computer 51 is read and it is supplied to the station for the photographic processing requiring the information, where the photographic processing in the large laboratory is carried out on the basis of the necessary information will be explained with reference to FIG. 10(a), and (b). Further, as to the case where the photographic processing is carried out on the basis of the information recorded on the photographic film, the method of producing the information-recorded medium will be stated in the explanation for FIG. 10(b).

First, the explanation regarding FIG. 10(a) is given. The automatic developing apparatus for the undeveloped photographic film 55 transmits the information on the results of the development processing, for example, the information on which receipt number the development-processed photographic film has, and if necessary, the information on how many exposure-type the processed photographic film is to the control computer 51 (It is omitted in the already given explanations the following: the automatic development apparatus 55 is equipped with the reading means for reading the information recorded in the photographic film (not shown in the drawing), especially the receipt number and the information on how many exposure-type the processed photographic film is. Further, in case where the control computer memorizes the receipt number and the information on how many exposure-type the processed photographic film is in the state to be in correspondence, it is not necessary to transmit the information on how many exposure-type the processed photographic film is to the control computer 51.).

From the print making processing station which is principally composed of the exposure apparatus 72 and the automatic developing apparatus 73, the information on the results of print processing, for example, how many prints are made with the photographic film and which receipt number it has, or how many prints are made with the ordered frame and which one it is of the photographic film and which receipt number it has, is transmitted to the control computer 51 by a transmitting means. Here, in the print making process the receipt number recorded in the photographic film is read by the aforesaid reading means 95, and the information on how many prints are made from the photographic film of the receipt number is obtained by counting the number of exposures at the exposure apparatus 72 or the number of cutting times for every order unit by the counter provided in the aforesaid cutting apparatus 96. These transmitted results of the development and print processing are memorized in the control computer 51, being made to be in correspondence on the basis of the receipt number to the information memorized in the memory means of the control computer 51 in the state of correspondence to the receipt number.

Further, in case of the photographic processing system in which the order of those bits of information which are already memorized in the state of correspondence to the receipt number in the control computer 51 is the same as the order of the processing of the photographic film, it is not necessarily required to make the correspondence and results of the processing may simply be memorized in the control computer 51.

Then the control means 402 which grasp the situations of the processing, such as the situation of the development of the photographic film of a certain order unit in the developing process, the situation of the exposure with the photographic film of a certain order unit in the print making process, and the situation of the development of the photo-prints made on the basis of the photographic film of this order unit, transmits the situations of the processing concerning the photographic film of this order unit to the control computer 51. As for the situation of the development of the photographic film of an order unit, for example, the situation where the developing just starts now for the photographic film of an order unit having a certain receipt number, the situation where the developing has been finished for the photographic film of an order unit having a certain receipt number, or something else can be cited. As for the situation of the exposure with the photographic film of a certain order unit, for example, the situation where the exposure just starts now with the photographic film of a certain order unit having a certain receipt number, the situation where the exposure has been finished with the photographic film of a certain order unit having a certain receipt number, or something else can be cited. Further, as for the situation of the development of the photo-prints made on the basis of the photographic film of a certain order unit, the situation where the developing just starts now for the photographic paper exposed based on the photographic film of a certain order unit, the situation where the developing has been finished for the photographic paper exposed based on the photographic film of a certain order unit, or something else can be cited.

Further, the control computer 51 controls the transmitting of the information such as the aforesaid information memorized in the control computer 51 and the results of the processing in each process station to the recording apparatus 401 for recording said information on the recording medium, on the basis of the transmitted situation of the processing, judging the timing of transmitting for itself. Further, it is described above the example, where the timing of transmitting is judged by the control computer itself, however, the aforesaid control means 402 may be made to transmit to the control computer 51, in addition to the situations of the processing, the information instructing the timing for the control computer 51 to transmit the information, so that the control computer 51 may output the information to the recording apparatus 401 on the basis of this transmitted instruction information.

It is favorable that the above-mentioned timing of the transmission should be such one as to make the photographic processing system easy to control and to be capable of aiming at the simplification of the photographic processing system. For instance, in case of the order for the simultaneous print processing or the order for the re-print processing, if the timing of producing the information recorded medium is too much earlier than the timing of producing the photo-prints (the timing of the completion of development in case of the development-only processing), the situation such that there are a large number of recording medium on which the information is recorded in the state of absence of the photo-prints to be made in correspondence (the developed photographic film in case of the development-only processing) occurs, resulting in the increased complicatedness in the control and the collation with the photo-prints of the recording medium. On the contrary, if the timing of producing the information recorded medium is too much later than the timing of producing the photo-prints, of course the complicatedness in the control and the collation with the recording medium of the photo-prints increases, and moreover, the situation such that the photo-prints have already been produced but are unable to be returned from the large laboratory occurs. Therefore, it is favorable that the production of the information recorded medium is carried out at the timing such that the above-mentioned problems do not occur, and in particular, at the timing such that the production of the information recorded medium is completed approximately at the same time when the production of photo-prints is completed.

The control means (not shown in the drawing) provided in the recording apparatus 401, to which the information such as the information memorized in the aforesaid control computer 51 and the results of the processing in each process station has been transmitted from the control computer 51, recognizes that these bits of information have been transmitted as the instruction to output the record, and controls the recording apparatus to record these bits of information on the recording medium. This transmission of the information is not necessarily made directly but it may be appropriate that the information from the control computer 51 is memorized in a portable memory medium for electronic information (such as a floppy disc) and transmitted off-line to the recording medium. Regarding the case where the information recorded in the photographic film is used instead of the information memorized in the control computer 51, the same remark as the above can be made. Further, it may be appropriate too, that the instruction information for outputting the record of the above-mentioned information, together with the above-mentioned information, is transmitted to the recording apparatus, and the control means provided in the recording apparatus controls the recording by it.

Figure 10:
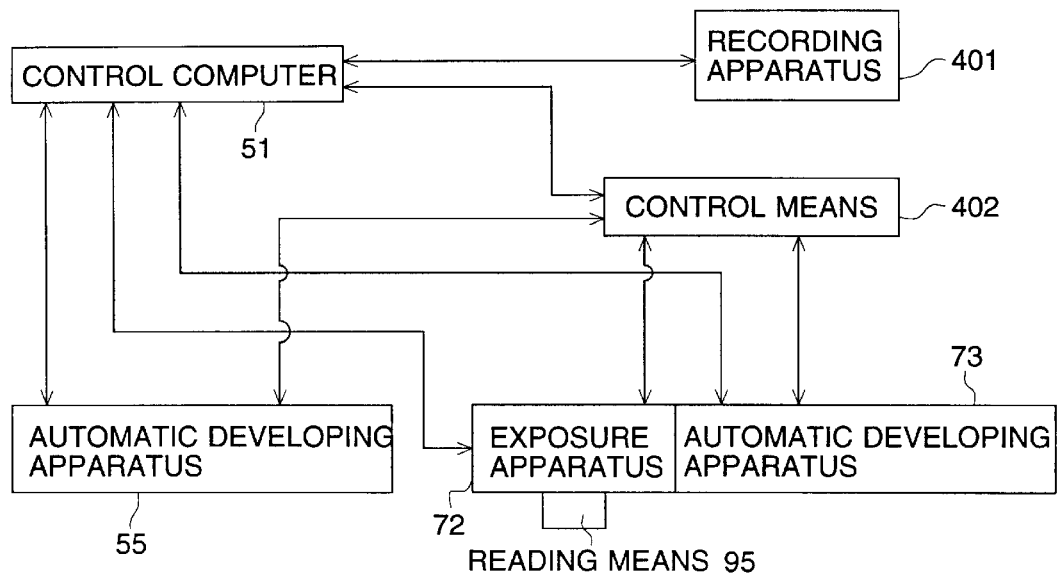
FIGS. 10(a) and 10(b) show a structure for making the information-recorded medium.
Figure 10:
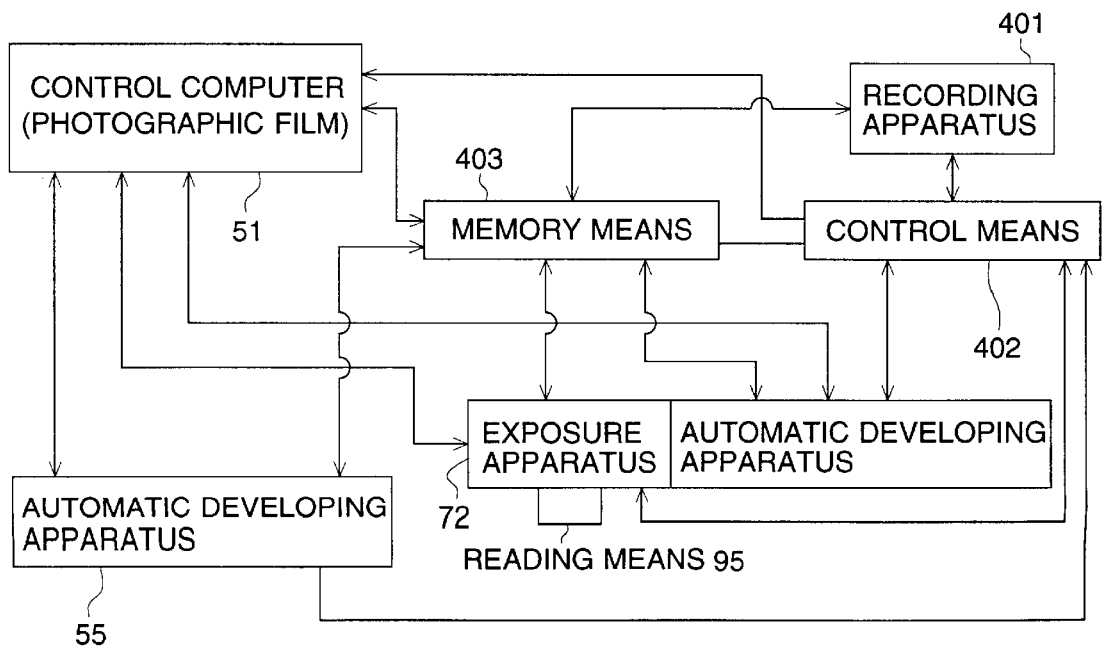

Further, the information on the results of the processing in each process station may be subjected to the information processing by the control computer 51 and the information processing means provided in the recording apparatus, so that the processed information may be recorded on the recording medium by the recording apparatus. This information processing comprises the processing such as the one for calculating the development charge according to the information on the result of the development processing of the film and the one for calculating the print charge from the result of the print processing. In the above-mentioned explanation, the example in which the results of the development and print processing are memorized in the memory means of the control computer 51 is shown, but the information may be memorized in the memory means 403 provided separately from the control computer 51 as shown in FIG. 10(*b*). The control means 402 for controlling this memory means makes the control computer transmit the information which is already memorized in the state of correspondence to the receipt number, and may also use the information recorded in the photographic film instead of the information memorized in the control computer 51. In this case, it receives the receipt number recorded in the photographic film and read by the reading means, and the information memorized in the state of correspondence to this receipt number. It makes the memory means 403 memorize this information and the information on the results of the development and print processing on the basis of the receipt number. Further, this control means grasps the situation of the processing for producing the photo-prints, and controls the timing of transmitting the information memorized in the memory means 403 to the recording apparatus 401. Still further, it may be appropriate to transmit the information instructing to output the information for recording from this control means.

Further, in addition to the aforesaid information memorized in the control computer 51 and the information on the results of the processing in each process station, some additional information may be recorded on the recording medium. As for the additional information, the information such as the advertisement of the products of which the dealing store expects promotion of marketing and the PR words of the dealing store itself is cited; further, it may be some other information which is not directly concerned with the photographic processing. In addition, the medium on which the additional information is recorded may be made separately from the recording medium on which the other information is recorded.

This additional information is memorized in the control computer 51 or the memory means 403, and if it is related to a particular dealing store, it is memorized in one or the other of them in the state of correspondence to the dealing store specifying information memorized in one or the other of them. For the ease of making the correspondence, the additional information is inputted and memorized in the control computer or the memory means 403 in the state of correspondence to the dealing store specifying information.

Figure 11:
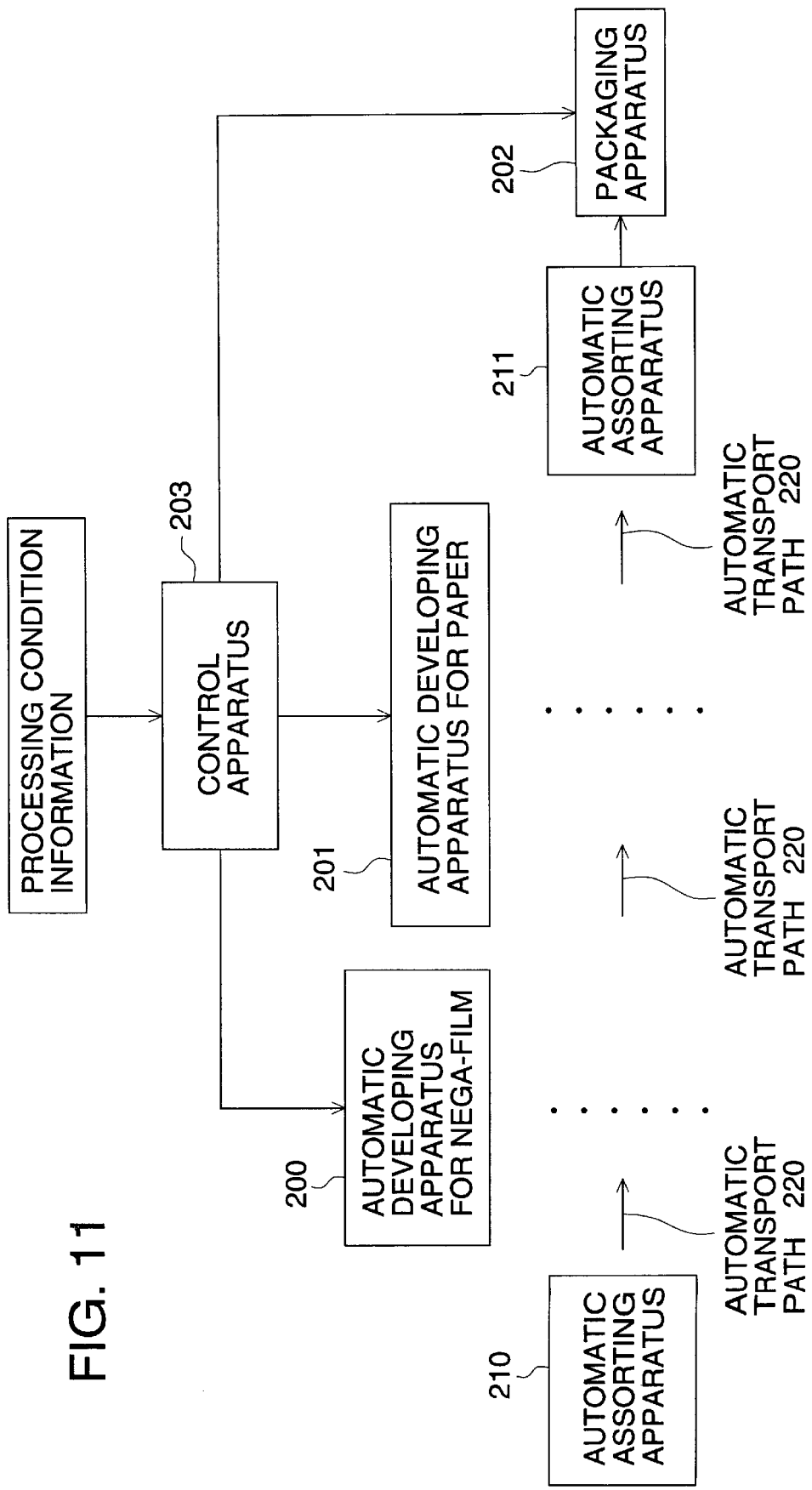
FIG. 11 is a drawing showing the outline of the structure of another example of practice of the photographic processing system.

Now, another photographic processing system will be explained briefly in the following. As shown in FIG. 11, the plural automatic negative developing apparatus 200 which carries out the negative film developing process, the plural automatic paper developing apparatus 201 which carries out the paper developing process, and the one or more packaging apparatus 202 are provided in the system, and the control apparatus 203 determines (1) whether the negative developing process is carried out or not, and if done, by which automatic negative developing apparatus it is done, and (2) whether the paper developing process is carried out or not, and if done, by which automatic paper developing apparatus 201 it is done, on the basis of the information on the processing conditions which is carried by the negative film to be processed or the film cartridge. Further, the control apparatus 203 can also determine the above-mentioned items (1) and (2) on the basis of the information on the processing conditions memorized in the state of correspondence to the film specifying information which is carried by the negative film to be processed or the film cartridge.

According to this photographic processing system, a combination of mutually different numbers of each, not the plural combinations of each one, of the automatic negative developing apparatus 200, automatic paper developing apparatus 201, and packaging apparatus 202 can be used for the photographic processing, and in that case, with no person present in the processes, by the information, such as the simultaneous print, the re-print, and the print size, recorded in the negative film or the film cartridge, the processing apparatus and the process can be selected, resulting in the promotion of the automation in the large laboratory.

Further, the automatic assorting apparatus 210, and 211 are provided, and each between the automatic assorting apparatus 210 and the automatic negative developing apparatus 200, between the automatic negative developing apparatus 200 and the automatic paper developing apparatus 201, and between the automatic paper developing apparatus 201 and the automatic assorting apparatus 211, there is provided the automatic transport path 220, which transports automatically the photographic films to the next processing station on the basis of the next spot fixing information of the photographic film to be processed. Thus, in the photographic processing system which comprises the automatic assorting apparatus 210, and 211, the plural automatic negative developing apparatus 200 which carries out the negative film developing process, the plural automatic paper developing apparatus 201 which carries out the paper developing process, and the packaging apparatus 202, the photographic films can be automatically transported to the next process on the basis of the next spot fixing information of the film to be processed, resulting in the promotion of the automation of the processing.

What is claimed is:

1. A method of printing an image on a frame of a photographic film of a plurality of photographic films which belong to a print order, comprising:

forming a film assemblage containing a film piece of not longer than 9 cm without splicing;

exposing said image on a frame of said photographic film onto a photographic paper;

developing said photographic paper; and making said plurality of photographic films corresponding to said developed photographic paper.

2. The method of claim 1, wherein the film assemblage comprising a plurality of sets of said plurality of photographic films are received with plural printing orders.

3. A method of printing an image on plural film pieces onto a photographic paper at a request of a printing order, comprising:

incorporating the plural film pieces including a film piece whose length is not longer than 9 cm into a film assemblage without splicing the plural film pieces;

feeding the plural film pieces out of the film assemblage without splicing the plural film pieces;

exposing an image on the plural film pieces fed from the film assemblage onto the photographic paper;

developing the exposed photographic paper so as to obtain a visual image; and making the plural film pieces to correspond to the developed photographic paper for the printing order.

4. A method of printing an image on a frame of a photographic film of a plurality of photographic films which belong to a print order, comprising:

forming a film assemblage containing a film piece of not longer the 13 cm without splicing;

exposed said image on a frame of said photographic film onto a photographic paper;

developing said photographic films paper; and making said plurality of photographic films correspond to said developed photographic paper.

5. A method of printing an image on a frame of a photographic film of a plurality of photographic films which belong to a print order, comprising:

forming a film assemblage containing a film piece of not longer than a predetermined length without splicing;

exposing said image on a frame of said photographic film onto a photographic paper;

developing said photographic films paper; and making said plurality of photographic films correspond to said developed photographic paper.

6. A method of reprinting an image on a frame to be reprinted of a photographic film of a plurality of photographic films which belong to a reprint order, said plurality of photographic films containing a photographic film which consists of frames not to be reprinted, comprising:

forming a film assemblage which comprises all of said plurality of photographic films without splicing;

exposing said image on said frame to be reprinted onto a photographic paper; and developing said photographic paper.

7. The method of claim 6, wherein the film assemblage comprising a plurality of sets of said plurality of photographic films are received with plural printing orders.

8. The method of claim 6, wherein the plurality of photographic films are negative films.

9. The method of claim 6, wherein the photographic paper is a color negative photographic paper.

10. A method of reprinting an image on a frame to be reprinted of a photographic film of a plurality of photographic films which belong to a reprint order, said plurality of photographic films containing a photographic film which consists of frames not to be reprinted, comprising:

forming a film assemblage which comprises all of said plurality of photographic films without splicing;

exposing said image on said frame to be reprinted onto a photographic paper; and developing said photographic paper;

making said plurality of photographic films corresponding to said developed photographic paper; and wherein a group of said plurality of films corresponding to each said reprint order in said film assemblage have recorded information for identifying the order.

11. A method of reprinting an image on a frame of a photographic film pieces which belongs to a reprint order, wherein said reprint order contains first group of a plurality of photographic film pieces which have a frame with request for reprinting and second group of a plurality of photographic film pieces which have no frame with request for reprinting, comprising:

forming a film assemblage which comprises all of said plurality of photographic film pieces of said reprint order without splicing;

exposing said image on said frame to be reprinted onto a photographic paper; and developing said photographic paper.

12. A method of reprinting an image on a frame of a photographic film piece which belongs to a reprint order, wherein said reprint order contains a plurality of photographic film pieces at least one of which pieces containing no frames being ordered to be reprinted, comprising;

forming a film assemblage which comprises all of said plurality of film pieces of said reprint order without splicing, exposing said image on said frame to be reprinted onto a photographic paper, and developing said photographic paper.

13. A method of reprinting an image on a frame of a photographic film piece which belongs to a reprint order, wherein said reprint order contains a plurality of photographic film pieces at least one of which pieces containing no frames being ordered to be reprinted, comprising;

forming a film assemblage which comprises all of said plurality of film pieces of said reprint order without splicing, exposing said image on said frame to be reprinted onto a photographic paper, developing said photographic paper, and making the correspondence of said developed photographic paper with said plurality of film pieces of said reprint order.

14. The method of claim 13 further comprising: detecting at least one of the first photographic film piece and the last photographic film piece among said plurality of photographic film pieces of said reprint order after said exposing.

15. A method of reprinting an image on a frame of a photographic film piece which belongs to a reprint order, wherein said reprint order contains a plurality of photographic film pieces at least one of which pieces containing no frames being ordered to be reprinted, comprising;

forming a film assemblage which comprises all of said plurality of film pieces of said reprint order without splicing, exposing said image on said frame being ordered to be reprinted by feeding said plurality of photographic films from said film assemblage to a printer to reproduce said image onto a photographic paper, and developing said photographic paper.

16. A method of reprinting an image on a frame of a film piece among plural film pieces received with a printing order onto a photographic paper, comprising:

incorporating the plural film pieces into a film assemblage without splicing the plural film pieces with no consideration whether each of the plural film pieces has a frame to be reprinted;

feeding the plural film pieces out of the film assemblage;

exposing the image of the film piece among the plural film pieces fed from the film assemblage onto the photographic paper; and developing the exposed photographic paper so as to obtain a visual image.

17. The method of claim 16, wherein plural sets of plural film pieces are received with plural printing orders and are incorporated in the film assemblage.

18. A method of reprinting an image on a frame of a film piece among plural film pieces received with a printing order onto a photographic paper, comprising:

incorporating the plural film pieces sequentially into a film assemblage without splicing the plural film pieces with no consideration whether each of the plural film pieces has a frame to be reprinted;

providing identification information of the printing order onto the last film piece in the incorporating sequence of the plural film pieces;

feeding the plural film pieces out of the film assemblage without splicing the plural film pieces;

exposing an image of a film piece among the plural film pieces fed from the film assemblage onto the photographic paper;

developing the exposed photographic paper so as to obtain a visual image; and making the plural film pieces received with the printing order to correspond to the developed photographic paper.

\* \* \* \* \*